US011239784B2

United States Patent
Nakao et al.

(10) Patent No.: US 11,239,784 B2
(45) Date of Patent: Feb. 1, 2022

(54) MOTOR DRIVE DEVICE, CONTROLLER, AND ELECTRIC VEHICLE SYSTEM

(71) Applicant: HITACHI AUTOMOTIVE SYSTEMS, LTD., Hitachinaka (JP)

(72) Inventors: Noriya Nakao, Tokyo (JP); Kazuaki Tobari, Tokyo (JP); Fumikazu Takahashi, Hitachinaka (JP); Shingo Nishiguchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/049,650

(22) PCT Filed: Mar. 14, 2019

(86) PCT No.: PCT/JP2019/010461
§ 371 (c)(1),
(2) Date: Oct. 22, 2020

(87) PCT Pub. No.: WO2019/208007
PCT Pub. Date: Oct. 31, 2019

(65) Prior Publication Data
US 2021/0257946 A1    Aug. 19, 2021

(30) Foreign Application Priority Data
Apr. 26, 2018  (JP) .............................. JP2018-085261

(51) Int. Cl.
*H02P 21/00*    (2016.01)
*H02P 21/22*    (2016.01)
(Continued)

(52) U.S. Cl.
CPC .............. *H02P 21/22* (2016.02); *H02P 21/05* (2013.01); *H02P 21/14* (2013.01); *H02P 27/06* (2013.01)

(58) Field of Classification Search
CPC .......... H02P 21/22; H02P 21/05; H02P 21/14; H02P 27/06
(Continued)

(56) References Cited

U.S. PATENT DOCUMENTS

2001/0002631 A1    6/2001   Okanoue
2003/0001536 A1*   1/2003   Kitajima ................. H02P 21/06
                                                                318/629
(Continued)

FOREIGN PATENT DOCUMENTS

JP     2000-108916 A     4/2000
JP     2007-209157 A     8/2007
(Continued)

OTHER PUBLICATIONS

International Search Report with English translation and Written Opinion issued in corresponding application No. PCT/JP2019/010461 dated Jul. 16, 2019.
(Continued)

*Primary Examiner* — Erick D Glass
(74) *Attorney, Agent, or Firm* — Foley & Lardner LLP

(57) ABSTRACT

Stable current control is performed even at the time of occurrence of disturbance, while the steadily occurring current pulsation is suppressed. A motor drive device 100 includes a power conversion circuit 103 that drives an alternating-current motor 101, and a controller 102 that controls the power conversion circuit 103. The controller 102 includes a voltage command calculation unit 108, a control state judgement unit 112, and a control gain change unit 113. When the determination signal output from the control state judgement unit 112 is switched from a determination signal representing a steady state to a determination signal representing a transient state, the control gain change unit 113 immediately changes the control gain to a (Continued)

value of normal setting, and when the judgement signal output from the control state judgement unit 112 is switched from a determination signal representing the transient state to a judgement signal representing the steady state, the control gain change unit 113 changes, with a predetermined delay time, the control gain to a value of high-gain setting.

11 Claims, 12 Drawing Sheets

(51) Int. Cl.
*H02P 21/05* (2006.01)
*H02P 21/14* (2016.01)
*H02P 27/06* (2006.01)

(58) Field of Classification Search
USPC .................................................. 318/400.02
See application file for complete search history.

(56) References Cited

U.S. PATENT DOCUMENTS

| 2014/0028224 A1* | 1/2014 | Arima | H02P 21/24 |
| | | | 318/400.02 |
| 2016/0221602 A1* | 8/2016 | Takatsuka | B62D 6/02 |

FOREIGN PATENT DOCUMENTS

| JP | 4016888 B2 | 12/2007 |
| JP | 2013-038970 A | 2/2013 |
| JP | 2013-172612 A | 9/2013 |
| JP | 2013-249027 A | 12/2013 |
| JP | 2015-154689 A | 8/2015 |
| JP | 2017-220971 A | 12/2017 |

OTHER PUBLICATIONS

Extended European Search Report issued in corresponding European Patent Application No. 19791484.9 dated Dec. 9, 2021.

* cited by examiner

| JUDGEMENT SIGNAL $S_{jd}$ | $S_{jd\_p}$ | $S_{jd\_pn}$ | $S_{jd\_n}$ |
|---|---|---|---|
| PERMISSION SIGNAL $S_{pd}$ | 0 | 1 | 0 |

MOTOR DRIVE DEVICE, CONTROLLER, AND ELECTRIC VEHICLE SYSTEM

TECHNICAL FIELD

The present invention relates to a motor drive device, a controller, and an electric vehicle system.

BACKGROUND ART

In motor drive, current pulsation caused by PWM control of the inverter or the like occurs steadily. When the current pulsates, vibration and noise are generated, which causes adverse effects such as deterioration of comfort in an apparatus equipped with a motor, and hence effective measures against current pulsation are required.

As a measure against the current pulsation, for example, a method of improving control responsiveness by applying high-gain setting in which the control gain in the current control is higher than usual is known. This makes it possible to suppress the steadily occurring current pulsation.

On the other hand, however, an increase in the control gain increases the impact of calculation delay of the controller, a parameter setting error, or the like on the current control result, thereby causing an increase in the overshoot amount at the time of transient response, and deteriorating the control responsiveness. Therefore, it is necessary to appropriately switch the gain setting of the current control according to the control state.

Methods of switching the gain setting of current control include, for example, a method described in PTL 1 below. PTL 1 discloses an inverter control device for a rotary electric machine that controls a switching element provided in a current path on the basis of a current of each phase of U, V, and W flowing through in a three-phase alternating-current rotary electric machine, including a first proportional-integral control unit which calculates a control value on the basis of a proportion term of a d axis and an integration term of the d axis so as to reduce a difference between a d-axis command current value and a d-axis actual current value, a second proportional-integral control unit which calculates a control value on the basis of a proportion term of a q axis and an integration term of the q axis so as to reduce a difference between a q-axis command current value and a q-axis actual current value, and a gain adjustment means which decreases a gain of a term with a large fluctuation amount when fluctuation is large in at least one term of the proportion term of the d axis, the integration term of the d axis, the proportion term of the q axis or the integration term of the q axis.

CITATION LIST

Patent Literature

PTL 1: JP 2015-154689 A

SUMMARY OF INVENTION

Technical Problem

With the gain adjustment method disclosed in PTL 1, it becomes difficult to appropriately set the gain of current control at the time of occurrence of disturbance in which the current accidentally changes steeply due to disturbance. Accordingly, stable current control cannot be performed at the time of occurrence of disturbance.

Solution to Problem

A motor drive device according to the present invention includes a power conversion circuit that drives an alternating-current motor, and a controller that controls the power conversion circuit, wherein the controller has a voltage command calculation unit that calculates a voltage command for operating the power conversion circuit on the basis of a current deviation, which is a difference between a current command and an actual current flowing through the alternating-current motor, a control state judgement unit that outputs a judgement signal corresponding to a control state of the power conversion circuit on the basis of the current deviation, and a control gain change unit that changes a control gain used for the voltage command calculation unit to calculate the voltage command on the basis of the judgement signal, the control state judgement unit outputs a first judgement signal when the current deviation satisfies a predetermined range condition and outputs a second judgement signal when the current deviation does not satisfy the range condition, and the control gain change unit immediately changes the control gain to a value corresponding to the second judgement signal when a judgement signal output from the control state judgement unit is switched from the first judgement signal to the second judgement signal, and changes, with a predetermined delay time, the control gain to a value corresponding to the first judgement signal when a judgement signal output from the control state judgement unit is switched from the second judgement signal to the first judgement signal.

A controller according to the present invention is to control a power conversion circuit that drives an alternating-current motor, the controller including a voltage command calculation unit that calculates a voltage command for operating the power conversion circuit on the basis of a current deviation corresponding to a difference between a current command and an actual current flowing through the alternating-current motor, a control state judgement unit that outputs a judgement signal corresponding to a control state of the power conversion circuit on the basis of the current deviation, and a control gain change unit that changes a control gain used for the voltage command calculation unit to calculate the voltage command on the basis of the judgement signal, wherein the control state judgement unit outputs a first judgement signal when the current deviation satisfies a predetermined range condition and outputs a second judgement signal when the current deviation does not satisfy the range condition, and the control gain change unit immediately changes the control gain to a value corresponding to the second judgement signal when a judgement signal output from the control state judgement unit is switched from the first judgement signal to the second judgement signal, and changes, with a predetermined delay time, the control gain to a value corresponding to the first judgement signal when a judgement signal output from the control state judgement unit is switched from the second judgement signal to the first judgement signal.

An electric vehicle system according to the present invention includes the motor drive device, the alternating-current motor, a pivotally supported axle mechanically connected with the alternating-current motor, a wheel fixed to the axle, and a driving battery that supplies power to the motor drive device.

Advantageous Effects of Invention

According to the present invention, it is possible to perform stable current control even at the time of occurrence of disturbance while suppressing the steadily occurring current pulsation.

DESCRIPTION OF EMBODIMENTS

The present invention is summarized to realize stable current control by immediately resetting to normal setting applied in a transient state in a disturbance occurrence state, in operation of switching the gain setting of the current control to after judging the transient state and a steady state. Therefore, a feasible embodiment can be configured for each means for realizing the delay time element. Hereinafter, representative embodiments of the present invention will be described.

First Embodiment

Figure 1:
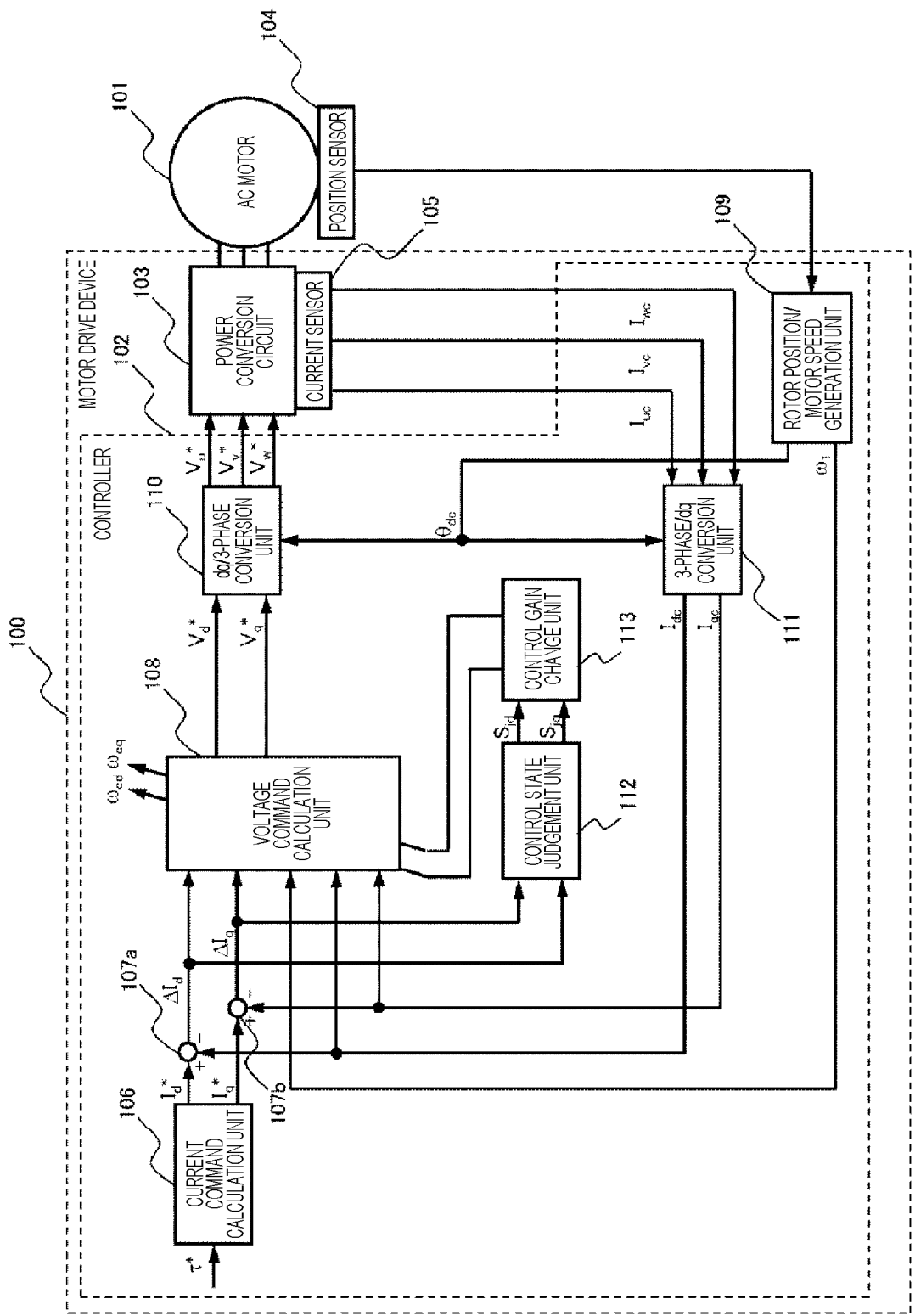
FIG. 1 is a view presenting a configuration of a motor drive device according to a first embodiment of the present invention.

FIG. 1 illustrates a configuration of the motor drive device according to the first embodiment of the present invention. As shown in FIG. 1, a motor drive device 100 according to the present embodiment includes a controller 102 and a power conversion circuit 103 that drives an alternating-current motor 101. A position sensor 104 is attached to the alternating-current motor 101, and a current sensor 105 is attached to the power conversion circuit 103. The alternating-current motor 101 is a motor rotationally driven by alternating-current power output from the motor drive device 100, and is a three-phase synchronous motor, for example. The power conversion circuit 103 is a circuit that, in response to control of the controller 102, converts direct-current power into alternating-current power and outputs the alternating-current power to the alternating-current motor 101, and is a three-phase full-bridge inverter configured using a plurality of semiconductor elements, for example.

By performing a current control calculation with vector control as a basic configuration, the controller 102 controls the current of the alternating-current power output from the power conversion circuit 103 to the alternating-current motor 101, and performs torque control of the alternating-current motor 101. The controller 102 receives a torque command $\tau^*$ from outside, and outputs three-phase voltage commands $V_u^*$, $V_v^*$, and $V_w^*$ to the power conversion circuit 103. The power conversion circuit 103 operates on the basis of the three-phase voltage commands $V_u^*$, $V_v^*$, and $V_w^*$ output from the controller 102, and performs power conversion from direct-current power to alternating-current power.

The controller 102 has functional blocks of a current command calculation unit 106, subtraction units 107a and 107b, a voltage command calculation unit 108, a rotor position/motor speed generation unit 109, a dq/3-phase conversion unit 110, a 3-phase/dq conversion unit 111, a control state judgement unit 112, and a control gain change unit 113. The controller 102 can implement these functional blocks by using a predetermined program executed by a microcomputer or by using hardware such as a field programmable gate array (FPGA).

The current command calculation unit 106 calculates a d-axis current command $I_d^*$ and a q-axis current command $I_q^*$ on the basis of the torque command $\tau^*$ input to the controller 102. The current command calculation unit 106 includes a lookup table in which, for example, the torque command $\tau^*$ and the d-axis current command $I_d^*$ and the q-axis current command $I_q^*$ are associated.

The subtraction unit 107a calculates a difference $\Delta I_d$ between the d-axis current command $I_d^*$ calculated by the current command calculation unit 106 and a d-axis actual current $I_{dc}$ output from the 3-phase/dq conversion unit 111. The subtraction unit 107b calculates a difference $\Delta I_q$ between the q-axis current command $I_q^*$ calculated by the current command calculation unit 106 and a q-axis actual current $I_{qc}$ output from the 3-phase/dq conversion unit 111. It is to be noted that the differences $\Delta I_d$ and $\Delta I_q$, which are calculated by the subtraction units 107a and 107b, respectively, indicate the current deviation used in a current control calculation performed by the controller 102, and represent how much the current commands (d-axis current command $I_d^*$, q-axis current command $I_q^*$) corresponding to the torque command $\tau^*$ are different from the currents (d-axis actual current $I_{dc}$, q-axis actual current $I_{qc}$) actually flowing through in the alternating-current motor 101.

The voltage command calculation unit 108 calculates a d-axis voltage command $V_d^*$ and a q-axis voltage command $V_q^*$ on the basis of the differences $\Delta I_d$ and $\Delta I_q$ calculated by the subtraction units 107a and 107b, respectively, the d-axis actual current $I_{dc}$ and the q-axis actual current $I_{qc}$ output from the 3-phase/dq conversion unit 111, and a motor speed col calculated by the rotor position/motor speed generation unit 109. At this time, the voltage command calculation unit 108 performs a voltage command calculation for calculating the d-axis voltage command $V_d^*$ and the q-axis voltage command $V_q^*$ by using a d-axis current controlling gain $\omega_{cd}$ and a q-axis current controlling gain $\omega_{cq}$ determined by the control gain change unit 113. It is to be noted that the details of the voltage command calculation performed by the voltage command calculation unit 108 will be described later.

The position sensor 104 is, for example, an encoder or a resolver, and outputs a signal corresponding to the rotation of the rotor of the alternating-current motor 101. From an output signal of the position sensor 104, the rotor position/motor speed generation unit 109 calculates the motor speed col representing the rotation speed of the alternating-current motor 101 and a rotor position $\theta_{dc}$ of the alternating-current motor 101.

On the basis of the rotor position $\theta_{dc}$ of the alternating-current motor 101 calculated by the rotor position/motor speed generation unit 109, the dq/3-phase conversion unit 110 converts the d-axis voltage command $V_d^*$ and the q-axis voltage command $V_q^*$ calculated by the voltage command calculation unit 108 into the three-phase voltage commands $V_u^*$, $V_v^*$, and $V_w^*$. On the basis of the rotor position $\theta_{dc}$, the 3-phase/dq conversion unit 111 converts three-phase actual currents $I_{uc}$, $I_{vc}$, and $I_{wc}$ flowing through in respective phases of the alternating-current motor 101 detected by the current sensor 105 into the d-axis actual current $I_{dc}$ and the q-axis actual current $I_{qc}$.

On the basis of the differences $\Delta I_d$ and $\Delta I_q$ calculated by the subtraction units 107a and 107b, respectively, the control state judgement unit 112 outputs a d-axis current controlling judgement signal $S_{jd}$ and a q-axis current controlling judgement signal $S_{jq}$ corresponding to the control state of the power conversion circuit 103. On the basis of the d-axis current controlling judgement signal $S_{jd}$ and the q-axis current controlling judgement signal $S_{jq}$ output from the control state judgement unit 112, the control gain change unit 113 calculates the d-axis current controlling gain $\omega_{cd}$ and the q-axis current controlling gain $\omega_{cq}$, which are used for the calculation of the d-axis voltage command $V_d^*$ and the q-axis voltage command $V_q^*$, respectively by the voltage command calculation unit 108, and changes the values of the d-axis current controlling gain $\omega_{cd}$ and the q-axis current controlling gain $\omega_{cq}$ in accordance with these calculation results. It is to be noted that the details of the control state judgement unit 112 and the control gain change unit 113 will be described later.

The main components of the motor drive device 100 according to the present embodiment are as described above. Subsequently, the voltage command calculation performed by the voltage command calculation unit 108 will be described in detail.

Figure 2:
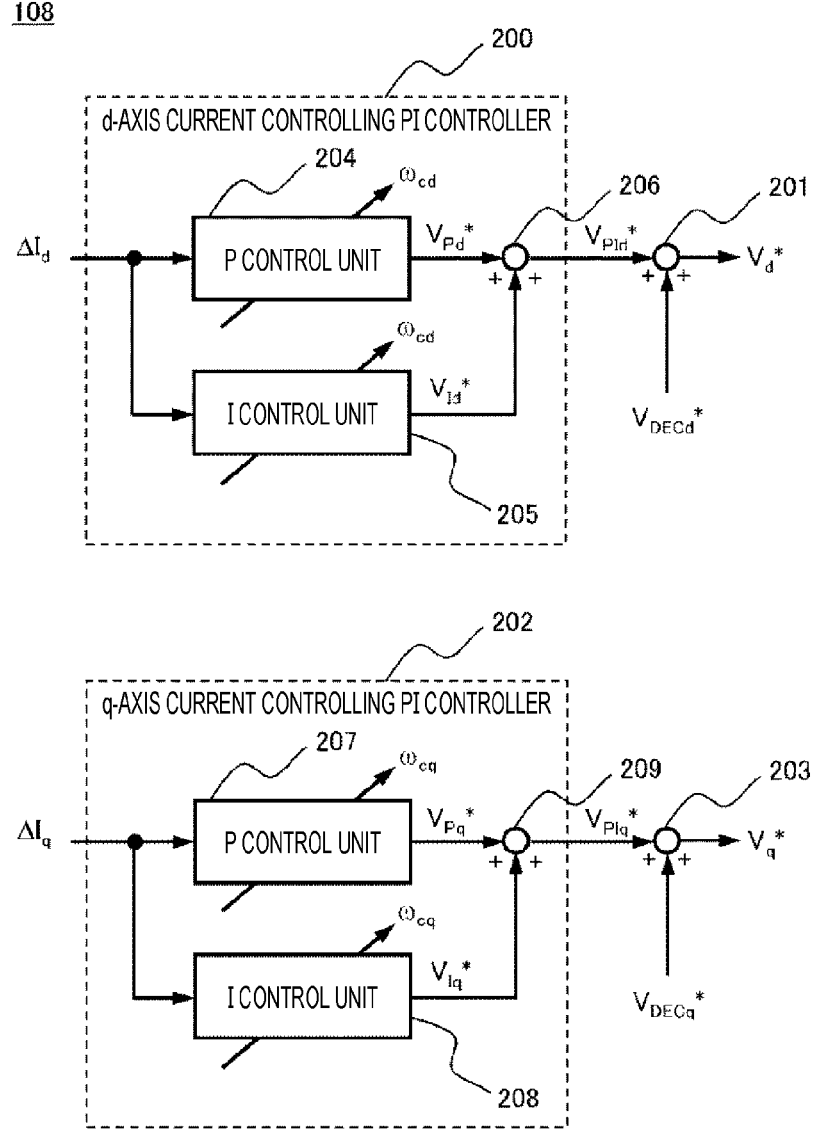
FIG. 2 is a view presenting an internal configuration of a voltage command calculation unit.

FIG. 2 illustrates the internal configuration of the voltage command calculation unit 108. As shown in FIG. 2, the voltage command calculation unit 108 includes a d-axis current controlling PI controller 200 and an addition unit 201 that are used for calculation of the d-axis voltage command $V_d^*$, and a q-axis current controlling PI controller 202 and an addition unit 203 that are used for calculation of the q-axis voltage command $V_q^*$.

The d-axis current controlling PI controller 200 includes a P control unit 204 and an I control unit 205, and calculates a d-axis control value $V_{PId}^*$ on the basis of the difference $\Delta I_d$. Specifically, the d-axis control value $V_{PId}^*$ is calculated as follows, for example.

The d-axis current controlling PI controller 200 calculates a d-axis proportional control value $V_{Pd}^*$ by performing a calculation presented in the following Expression (1) on the basis of the difference $\Delta I_d$ in the P control unit 204. In Expression (1), $K_{Pd}$ represents a predetermined d-axis side proportional control gain.

$$V_{Pd}^* = K_{Pd} \cdot \omega_{cd} \cdot \Delta I_d \tag{1}$$

The d-axis current controlling PI controller 200 calculates a d-axis integral control value $V_{Id}^*$ by performing a calculation presented in the following Expression (2) on the basis of the difference $\Delta I_d$ in the I control unit 205. In Expression (2), $K_{Id}$ represents a predetermined d-axis side integral control gain.

$$V_{Id}^* = K_{Id} \cdot \omega_{cd} \cdot \int \Delta I_d dt \tag{2}$$

After calculating the d-axis proportional control value $V_{Pd}^*$ and the d-axis integral control value $V_{Id}^*$ in the P control unit 204 and the I control unit 205, respectively, the d-axis current controlling PI controller 200 calculates the d-axis control value $V_{PId}^*$ by summing these calculation results in the addition unit 206. That is, the d-axis control value $V_{PId}^*$ is calculated as $V_{PId}^* = V_{Pd}^* + V_{Id}^*$.

It is to be noted that as presented in the above Expressions (1) and (2), the d-axis current controlling gain coca is multiplied in the calculations of the d-axis proportional control value $V_{Pd}^*$ and the d-axis integral control value $V_{Id}^*$. Accordingly, in the d-axis current controlling PI controller 200, the response speed until the difference $\Delta I_d$ converges to zero can be adjusted by changing the d-axis current controlling gain $\omega_{cd}$. However, while in the present embodiment, the d-axis current controlling gain $\omega_{cd}$ is multiplied in both the P control unit 204 and the I control unit 205, the d-axis current controlling gain $\omega_{cd}$ may be multiplied only in either the P control unit 204 or the I control unit 205.

After the d-axis control value $V_{PId}^*$ has successfully been calculated by the d-axis current controlling PI controller 200, the voltage command calculation unit 108 calculates the d-axis voltage command $V_d^*$ by adding a d-axis side non-interference control command $V_{DECd}^*$ to the d-axis control value $V_{PId}^*$ in the addition unit 201. That is, the d-axis voltage command $V_d^*$ is calculated as $V_d^* = V_{PId}^* + V_{DECd}^*$.

The d-axis side non-interference control command $V_{DECd}^*$ described above is obtained by the calculation presented in the following Expression (3), for example. In Expression (3), $L_{qc}$ represents a setting value of q-axis inductance.

$$V_{DECd}^* = -\omega_1 \cdot L_{qc} \cdot I_{qc} \tag{3}$$

In the d-axis current controlling PI controller 200 and the addition unit 201, the d-axis voltage command $V_d^*$ is calculated as described above.

It is to be noted that in the present embodiment, an explanation has been made regarding an example in which the d-axis side non-interference control command $V_{DECd}^*$ is calculated using the q-axis actual current $I_{qc}$ as shown in the above Expression (3), but the d-axis side non-interference control command $V_{DECd}^*$ may be calculated by another method. For example, the d-axis side non-interference control command $V_{DECd}^*$ may be calculated by using the q-axis current command $I_q^*$ in place of the q-axis actual current $I_{qc}$, or by using the calculation result of the d-axis integral control value $V_{Id}^*$ by the I control unit 205.

The q-axis voltage command $V_q^*$ is calculated also in the q-axis current controlling PI controller 202 and the addition unit 203 in the same manner as those in the d-axis current controlling PI controller 200 and the addition unit 201, respectively. That is, the q-axis current controlling PI controller 202 includes a P control unit 207 and an I control unit 208, and calculates a q-axis control value $V_{PIq}^*$ on the basis of the difference $\Delta I_q$. Specifically, the q-axis control value $V_{PIq}^*$ is calculated as follows, for example.

The q-axis current controlling PI controller 202 calculates a q-axis proportional control value $V_{Pq}*$ by performing a calculation presented in the following Expression (4) on the basis of the difference $\Delta I_q$ in the P control unit 207. In Expression (4), $K_{Pq}$ represents a predetermined q-axis side proportional control gain.

$$V_{Pq}* = K_{Pq} \cdot \omega_{cq} \cdot \Delta I_q \quad (4)$$

The q-axis current controlling PI controller 202 calculates a q-axis integral control value $V_{Iq}*$ by performing a calculation presented in the following Expression (5) on the basis of the difference $\Delta I_q$ in the I control unit 208. In Expression (5), $K_{Iq}$ represents a predetermined q-axis side integral control gain.

$$I_{Iq}* = K_{Iq} \cdot \omega_{cq} \int \Delta I_q dt \quad (5)$$

After calculating the q-axis proportional control value $V_{Pq}*$ and the q-axis integral control value $V_{Iq}*$ in the P control unit 207 and the I control unit 208, respectively, the q-axis current controlling PI controller 202 calculates the q-axis control value $V_{PIq}*$ by summing these calculation results in the addition unit 209. That is, the q-axis control value $V_{PIq}*$ is calculated as $V_{PIq}* = V_{Pq}* + V_{Iq}*$.

It is to be noted that as presented in the above Expressions (4) and (5), the q-axis current controlling gain $\omega_{cq}$ is multiplied in the calculations of the q-axis proportional control value $V_{Pq}*$ and the q-axis integral control value $V_{Iq}*$. Accordingly, in the q-axis current controlling PI controller 202, the response speed until the difference $\Delta_{Iq}$ converges to zero can be adjusted by changing the q-axis current controlling gain $\omega_{cq}$. However, while in the present embodiment, the q-axis current controlling gain $\omega_{cq}$ is multiplied in both the P control unit 207 and the I control unit 208, the q-axis current controlling gain $\omega_{cq}$ may be multiplied only in either the P control unit 207 or the I control unit 208.

After the q-axis control value $V_{PIq}*$ has successfully been calculated by the q-axis current controlling PI controller 202, the voltage command calculation unit 108 calculates the q-axis voltage command $V_q*$ by adding a q-axis side non-interference control command $V_{DECq}*$ to the q-axis control value $V_{PIq}*$ in the addition unit 203. That is, the q-axis voltage command $V_q*$ is calculated as $V_q* = V_{PIq}* + V_{DECq}*$.

The q-axis side non-interference control command $V_{DECq}*$ described above is obtained by the calculation presented in the following Expression (6), for example. In Expression (6), $L_{dc}$ represents a setting value of d-axis inductance, and $K_{Ec}$ represents a setting value of the induced voltage constant.

$$V_{DECq}* = \omega_1 \cdot (L_{dc} \cdot I_{dc} + K_{Ec}) \quad (6)$$

In the q-axis current controlling PI controller 202 and the addition unit 203, the q-axis voltage command $V_q*$ is calculated as described above.

It is to be noted that in the present embodiment, an explanation has been made regarding an example in which the q-axis side non-interference control command $V_{DECq}*$ is calculated using the d-axis actual current $I_{dc}$ as shown in the above Expression (6), but the q-axis side non-interference control command $V_{DECq}*$ may be calculated by another method. For example, the q-axis side non-interference control command $V_{DECq}*$ may be calculated by using the d-axis current command $I_d*$ in place of the d-axis actual current $I_{dc}$, or by using the calculation result of the q-axis integral control value $V_{Iq}*$ by the I control unit 208.

Figure 3:
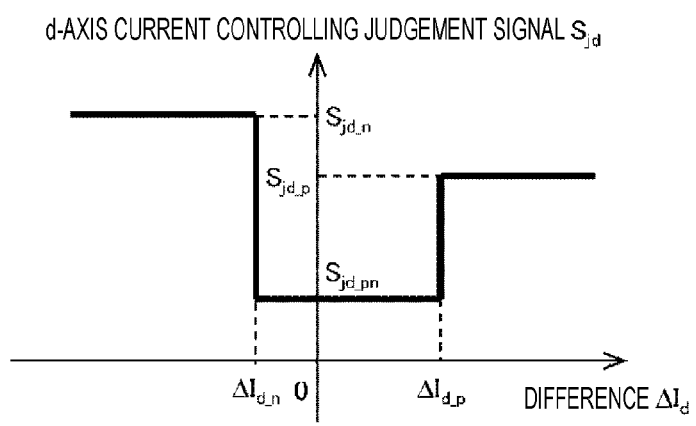
FIG. 3 is a view presenting judgement signal —current deviation characteristics in a control state judgement unit.

Next, the control state judgement unit 112 will be described in detail. FIG. 3 illustrates judgement signal—current deviation characteristics in the control state judgement unit 112, which is a feature of the present invention. In FIG. 3, the horizontal axis indicates the value of the difference $\Delta I_d$, which is the current deviation of the d-axis, and the vertical axis indicates the value of the d-axis current controlling judgement signal $S_{jd}$ output by the control state judgement unit 112.

In FIG. 3, when the difference $\Delta I_d$ satisfies the range condition of $\Delta I_{d\_n} \leq \Delta I_d \leq \Delta_{d\_p}$, i.e., when the current deviation is small and the control state of the power conversion circuit 103 can be regarded as a steady state, the value of the d-axis current controlling judgement signal $S_{jd}$ becomes $S_{jd} = S_{jd\_pn}$, which represents a steady state. On the other hand, when the difference $\Delta I_d$ does not satisfy the above range condition and $\Delta Id_{d\_p} < \Delta I_d$ (positive side) or $\Delta I_d < \Delta I_{d\_n}$ (negative side), i.e., when the current deviation is large and the control state of the power conversion circuit 103 can be regarded as a transient state, the value of the d-axis current controlling judgement signal $S_{jd}$ d is $S_{jd} = S_{jd\_p}$ on the positive side and $S_{jd} = S_{jd\_n}$ on the negative side, which represent the transient state, respectively. Thus, the values $S_{jd\_p}$ and $S_{jd\_n}$ of the d-axis current controlling judgement signal $S_{jd}$ in the transient state are made different from the value $S_{jd\_pn}$ of the d-axis current controlling judgement signal $S_{jd}$ in the steady state, whereby the control gain change unit 113 can judge the control state of the power conversion circuit 103 by the controller 102 on the basis of the d-axis current controlling judgement signal $S_{jd}$.

It is to be noted that FIG. 3 presents the judgement signal—current deviation characteristics in which the values $_{jd\_p}$ and $S_{jd\_n}$ of the d-axis current controlling judgement signal $S_{jd}$ representing the positive-side and negative-side transient states, respectively are different from each other, but in order to give the control state judgement unit 112 a simpler configuration, these values may be made equal as $_{jd\_p} = S_{jd\_n}$. Similarly, as for the threshold values $\Delta I_{d\_n}$ and $\Delta I_{d\_p}$ of the difference $\Delta I_d$ for discriminating between the transient state and the steady state, FIG. 3 presents an example in which the absolute values of them are different from each other, but in order to give the control state judgement unit 112 a simpler configuration, they may be $|\Delta I_{d\_n}| = |\Delta I_{d\_p}|$.

On the basis of the difference $\Delta I_d$ representing the current deviation of the d-axis, the control state judgement unit 112 outputs the d-axis current controlling judgement signal $S_{jd}$ having the characteristics described above. This makes it possible to output the d-axis current controlling judgement signal $S_{jd}$ as a judgement signal corresponding to the control state of the power conversion circuit 103 with respect to the d-axis. It is to be noted that the q-axis current controlling judgement signal $S_{jq}$ can also be output with the same characteristics as those of the d-axis current controlling judgement signal $S_{jd}$ on the basis of the difference $\Delta I_q$ representing the current deviation of the q-axis. This makes it possible to output the q-axis current controlling judgement signal $S_{jq}$ as a judgement signal corresponding to the control state of the power conversion circuit 103 with respect to the q-axis.

Figure 4:
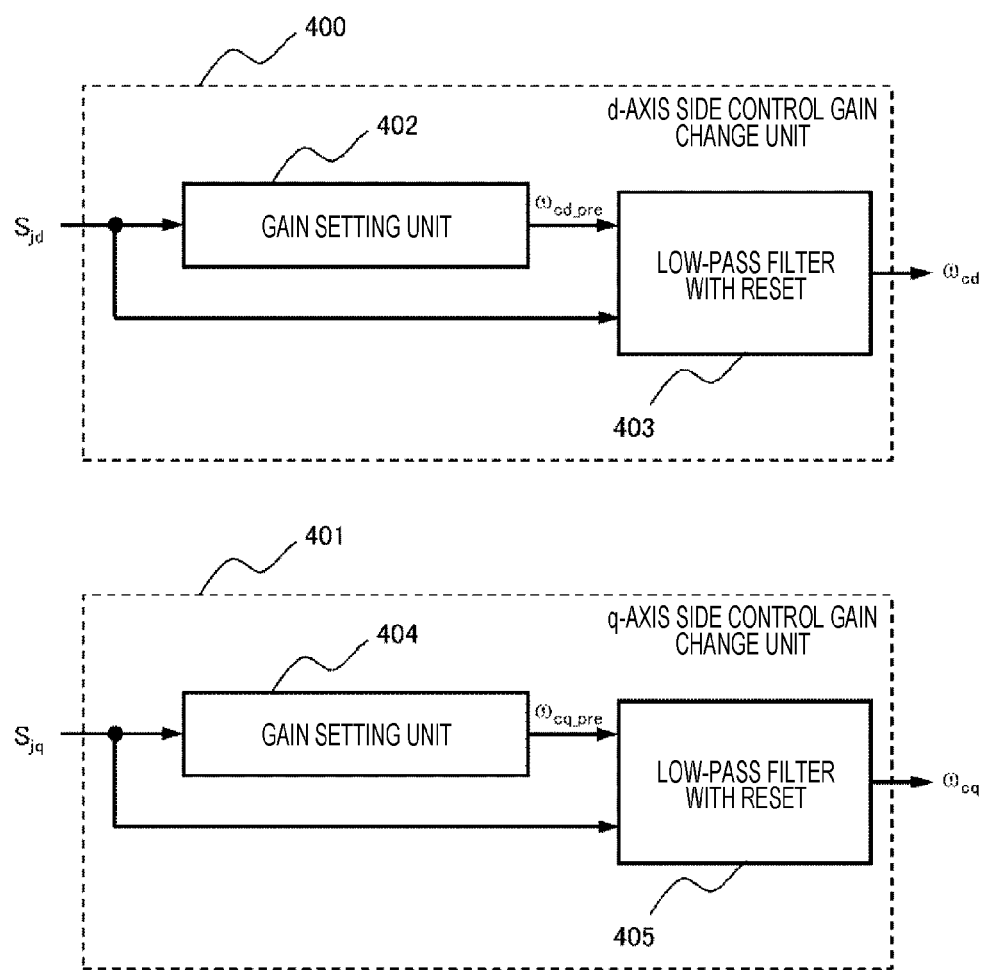
FIG. 4 is a view presenting an internal configuration of a control gain change unit in the first embodiment.

FIG. 4 illustrates the internal configuration of the control gain change unit 113, which is a feature of the present invention. As shown in FIG. 4, the control gain change unit 113 includes a d-axis side control gain change unit 400 used for calculation and change of the d-axis current controlling gain $\omega_{cd}$, and a q-axis side control gain change unit 401 used for calculation and change of the q-axis current controlling gain $\omega_{cq}$.

The d-axis side control gain change unit 400 includes a gain setting unit 402 and a low-pass filter 403 with reset.

Figure 5:
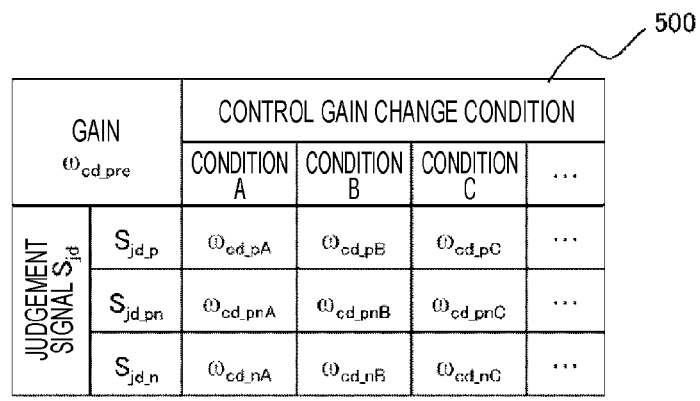
FIG. 5 is a view presenting a gain setting value lookup table of a gain setting unit.

The gain setting unit 402 determines a d-axis side control gain $\omega_{cd\_pre}$ before filtering processing on the basis of the d-axis current controlling judgement signal $S_{jd}$ and outputs the d-axis side control gain $\omega_{cd\_pre}$ to the low-pass filter 403 with reset. Specifically, as shown in FIG. 5, for example, a two-dimensional lookup table 500 is held in the gain setting unit 402, and the lookup table 500 is referred to, whereby the d-axis side control gain $\omega_{cd\_pre}$ before filtering processing corresponding to the d-axis current controlling judgement signal $S_{jd}$ is determined. In the lookup table 500, the value of the d-axis current controlling judgement signal $S_{jd}$ and the d-axis side control gain $\omega_{cd\_pre}$ before filtering processing for each control gain change conditions (condition A, condition B, condition C, . . . ) are associated two-dimensionally. Use of the lookup table 500 allows the gain setting unit 402 to determine the value of the d-axis side control gain $\omega_{cd\_pre}$ before filtering processing corresponding to the d-axis current controlling judgement signal $S_{jd}$.

It is to be noted that FIG. 5 presents an example of a two-dimensional lookup table for determining the value of the d-axis side control gain $\omega_{cd\_pre}$ before filtering processing from the d-axis current controlling judgement signal $S_{jd}$, but another gain change condition may be added to form a multidimensional lookup table, and the value of the d-axis side control gain $\omega_{cd\_pre}$ before filtering processing may be determined using this multidimensional lookup table. Specifically, for example, the motor speed $\omega_1$ and the carrier frequency of PWM control in the power conversion circuit 103 may be added as control gain change conditions.

Here, in the gain setting unit 402, as mentioned earlier, the current control in the steady state is performed by the high-gain setting, whereby the steadily occurring current pulsation can be suppressed. For example, in the lookup table 500 of FIG. 5, if "$\omega_{cd\_pA}<\omega_{cd\_pnA}$" or "$\omega_{cd\_nA}<\omega_{cd\_pnA}$" is set in the condition A, the high-gain setting can be applied. Similarly, if "$\omega_{cd\_pB}<\omega_{cd\_pnB}$" or "$\omega_{cd\_nB}<\omega_{cd\_pnB}$" is set in the condition B, the high-gain setting can be applied. The same is true for the other conditions.

The low-pass filter 403 with reset is a low-pass filter having a predetermined time constant, and calculates the d-axis current controlling gain $\omega_{cd}$ by transmitting the d-axis side control gain $\omega_{cd\_pre}$ before filtering processing calculated by the gain setting unit 402 with a delay time corresponding to the time constant. That is, the value of the d-axis current controlling gain $\omega_{cd}$ used when the voltage command calculation unit 108 calculates the d-axis voltage command $V_d^*$ is determined in accordance with the delay time element that the low-pass filter 403 with reset has. This can realize stable current control even in a disturbance occurrence state. Details will be described later.

The low-pass filter 403 with reset performs resetting of the output value when the d-axis current controlling judgement signal $S_{jd}$ changes from $S_{jd\_pn}$, which represents a steady state, to $S_{jd\_p}$, which represents a positive-side transient state, or changes from $S_{jd\_pn}$, which represents a steady state, to $S_{jd\_n}$, which represents a negative-side transient state. That is, when the control state of the power conversion circuit 103 shifts from the steady state to the transient state, the low-pass filter 403 with reset immediately returns the setting of the d-axis current controlling gain $\omega_{cd}$ from the high-gain setting corresponding to the steady state to the normal setting corresponding to the transient state.

The q-axis side control gain change unit 401 has the same configuration as the d-axis side control gain change unit 400 has. That is, the q-axis side control gain change unit 401 includes a gain setting unit 404 and a low-pass filter 405 with reset. The gain setting unit 404 determines a q-axis side control gain $\omega_{cq\_pre}$ before filtering processing on the basis of the q-axis current controlling judgement signal $S_{jq}$ and outputs the q-axis side control gain $\omega_{cq\_pre}$ to the low-pass filter 405 with reset. The low-pass filter 405 with reset is a low-pass filter having a predetermined time constant, and calculates the q-axis current controlling gain $\omega_{cq}$ by transmitting the q-axis side control gain $\omega_{cq\_pre}$ before filtering processing calculated by the gain setting unit 404 with a delay time corresponding to the time constant.

Figure 6:
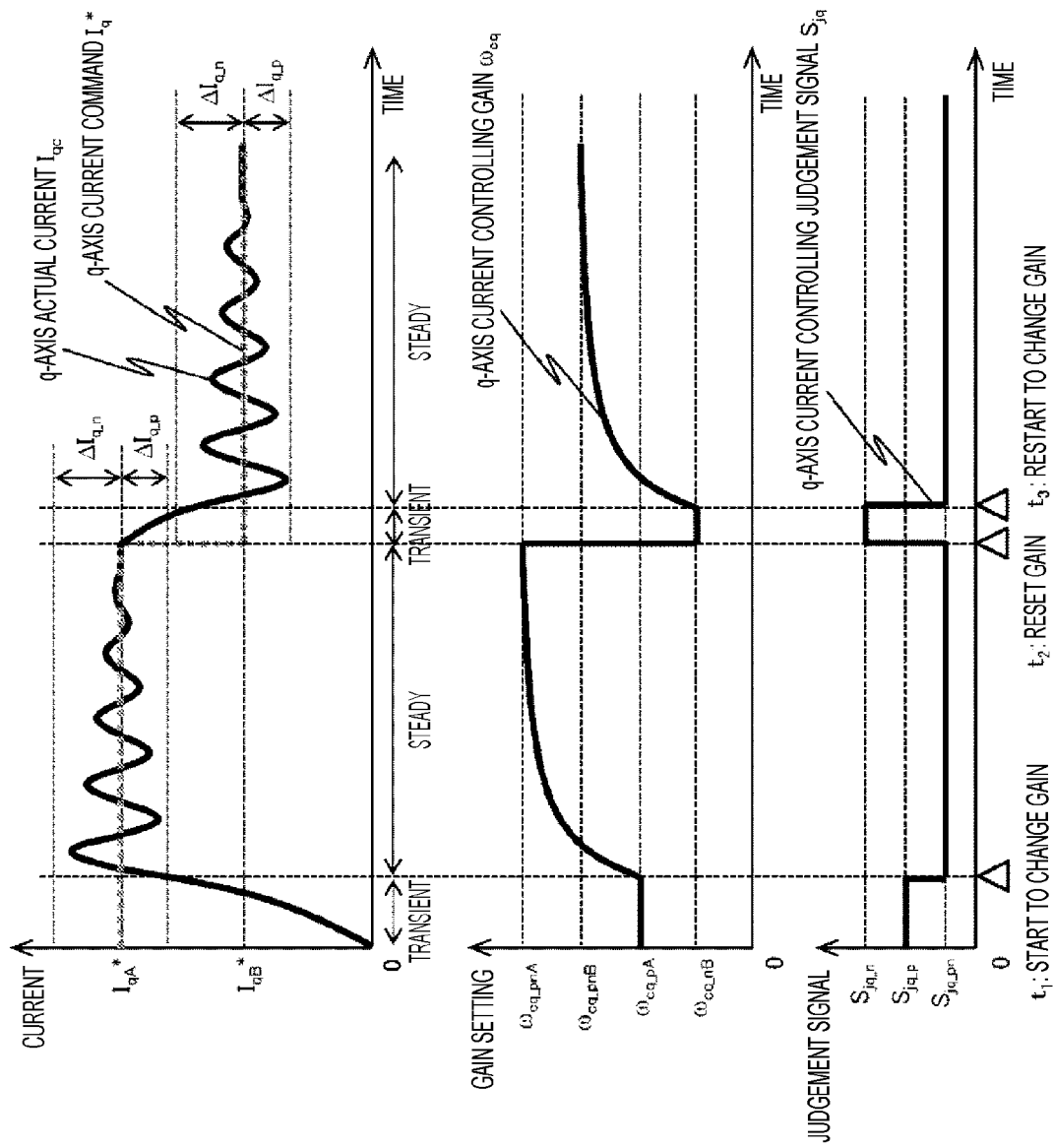
FIG. 6 is a view presenting an operation waveform example at a normal time of the motor drive device according to the first embodiment.

Next, a specific operation example of the motor drive device 100 according to the present embodiment will be described. First, an operation example at a normal time where a disturbance or the like does not occur will be described with reference to FIG. 6. FIG. 6 presents an operation waveform example at a normal time of the motor drive device 100 according to the first embodiment. It is to be noted that in the operation waveform of FIG. 6, it is assumed that the setting of the control gain follows the lookup table 500 described with reference to FIG. 5, and the control gain change unit 113 operates so that the current control is set to the high gain only in the steady state in order to suppress the steadily occurring current pulsation.

In the operation waveform of FIG. 6, it is assumed that the control gain change condition presented in FIG. 5 is switched from the condition A to the condition B when the current control shifts from the steady state to the next steady state via the transient state. Specifically, where the elapsed time from the start of the control is t and the time point at which the current control shifts from the steady state to the transient state is $t_2$, the condition A presented in FIG. 5 is selected when $0 \leq t < t_2$, and the condition B presented in FIG. 5 is selected when $t_2 \leq t$.

First, at t=0, when the input of the torque command $\tau^*$ to the controller 102 is started, the value of the q-axis current command $I_q^*$ changes stepwise from 0 to a predetermined command value $I_{qA}^*$ corresponding to the torque command $\tau^*$. Then, as presented in the upper part of FIG. 6, the q-axis actual current $I_{qc}$ rapidly increases from 0 towards $I_{qA}^*$, but in the period of $0 \leq t < t_1$, the value of the difference $\Delta I_q$ is large in the positive direction and $\Delta I_{q\_p} < \Delta I_q$. Therefore, the control state judgement unit 112 judges that the control state of the power conversion circuit 103 is a transient state, and the value of the q-axis current controlling judgement signal $S_{jq}$ output from the control state judgement unit 112 becomes $S_{jq}=S_{jq\_p}$, as presented in the lower part of FIG. 6. Accordingly, the value of the q-axis current controlling gain $\omega_{cq}$ output by the control gain change unit 113 is maintained at $\omega_{cq}=\omega_{cq\_pA}$, which is a value of the normal setting corresponding to the transient state, as presented in the middle part of FIG. 6.

Thereafter, where the time point at which the value of the difference $\Delta I_q$ coincides with the threshold value $\Delta I_{q\_p}$ is $t_1$, $\Delta_{q\_n} \leq \Delta I_q \leq \Delta I_{q\_p}$ is true in the period of $t_1 \leq t < t_2$. Therefore, the control state judgement unit 112 judges that the control state of the power conversion circuit 103 is a steady state, and the value of the q-axis current controlling judgement signal $S_{jq}$ output from the control state judgement unit 112 becomes $S_{jq}=S_{jq\_pn}$, as presented in the lower part of FIG. 6. That is, the value of the q-axis current controlling judgement signal $S_{jq}$ changes from $S_{jq\_p}$ to $S_{jq\_pn}$ at the time point $t_1$ and is maintained as it is until the time point $t_2$. The value of the q-axis current controlling gain $\omega_{cq}$ output by the control gain change unit 113 at this time is changed from $\omega_{cq\_pA}$ to $\omega_{cq\_pnA}$ (high-gain setting) with a certain delay time, as presented in the middle part of FIG. 6. This suppresses the steadily occurring current pulsation in the steady state.

At $t=t_2$, the value of the q-axis current command $I_q*$ changes stepwise from the previous command value $I_{qA}*$ to another command value $I_{qB}*$. Then, as presented in the upper part of FIG. 6, the q-axis actual current $I_{qc}$ maintained in the steady state decreases towards $I_{qB}*$, but in the period of $t_2 \le t < t_3$, the value of the difference $\Delta I_q$ is large in the negative direction and $\Delta I_q < \Delta I_{q\_n}$. Therefore, the control state judgement unit 112 judges that the control state of the power conversion circuit 103 is a transient state, and the value of the q-axis current controlling judgement signal $S_{jq}$ output from the control state judgement unit 112 becomes $S_{jq}=S_{jq\_pn}$, as presented in the lower part of FIG. 6. That is, when the q-axis current controlling judgement signal $S_{jq}$ changes from $S_{jq\_pn}$, which represents a steady state, to $S_{jq\_n}$, which represents a negative-side transient state, a rising edge occurs in the q-axis current controlling judgement signal $S_{jq}$, as presented in the lower part of FIG. 6. When this rising edge is detected, the output of the low-pass filter 405 with reset is reset as described above, and hence the value of the q-axis current controlling gain $\omega_{cq}$ output by the control gain change unit 113 is immediately changed from the value $\omega_{cq\_pnA}$ of high-gain setting to the value $\omega_{cq}=\omega_{cq\_nB}$ of normal setting corresponding to the transient state, as presented in the middle part of FIG. 6. It is to be noted that the setting value $\omega_{cq\_nB}$ of the q-axis current controlling gain $\omega_{cq}$ at this time is a different value from the setting value $\omega_{cq\_pA}$ of the q-axis current controlling gain $\omega_{cq}$ in the period of $0 \le t < t_1$.

Thereafter, where the time point at which the value of the difference $\Delta I_q$ coincides with the threshold value $\Delta I_{q\_n}$ is $t_3$, $\Delta I_{q\_n} \le \Delta I_q \le \Delta I_{q\_p}$ is true again in the period of $t_3 \le t$. Therefore, the control state judgement unit 112 judges that the control state of the power conversion circuit 103 is a steady state, and the value of the q-axis current controlling judgement signal $S_{jq}$ output from the control state judgement unit 112 becomes $S_{jq}=S_{jq\_pn}$, as presented in the lower part of FIG. 6. That is, the value of the q-axis current controlling judgement signal $S_{jq}$ changes from $S_{jq\_n}$ to $S_{jq\_pn}$ again at time point $t_3$ and is maintained thereafter. The value of the q-axis current controlling gain $\omega_{cq}$ output by the control gain change unit 113 at this time is changed from $\omega_{cq\_nB}$ to $\omega_{cq\_pnB}$ (high-gain setting) with a certain delay time, as presented in the middle part of FIG. 6. This suppresses the steadily occurring current pulsation, similarly to the period of $t_1 \le t < t_2$ described above.

As described above, in the operation at a normal time where a disturbance or the like does not occur, the current control can be set to the high gain only at the steady time by judging the control state of the power conversion circuit 103 from the value of the difference $\Delta I_q$. Therefore, it is possible to suppress the steadily occurring current pulsation without affecting the performance at the time of transient response.

Figure 7:
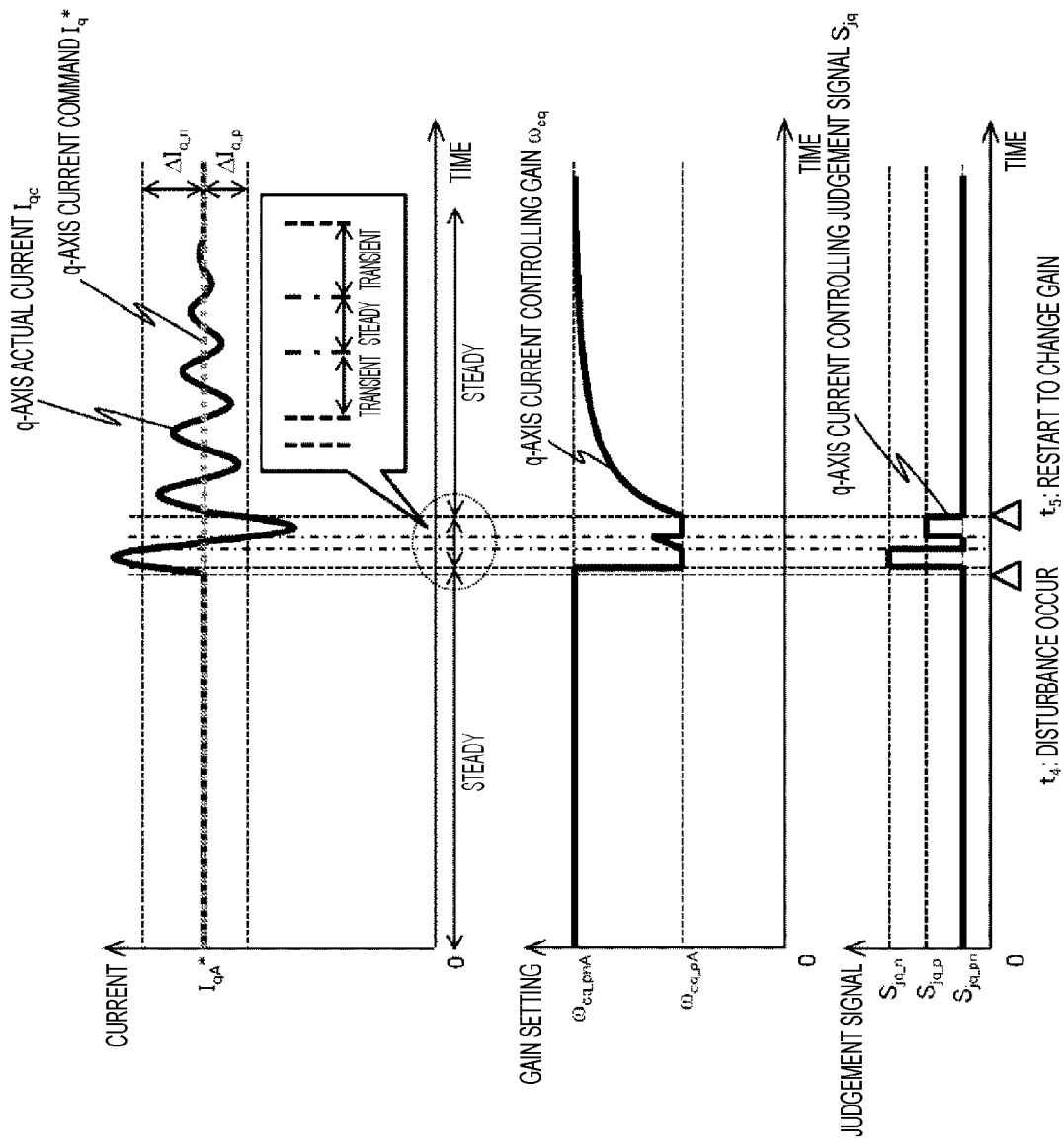
FIG. 7 is a view presenting an operation waveform example at the time of occurrence of disturbance of the motor drive device according to the first embodiment.

Subsequently, an operation example at the time of occurrence of disturbance in which an accidental disturbance occurs will be described with reference to FIG. 7. FIG. 7 presents an operation waveform example at the time of occurrence of disturbance of the motor drive device 100 according to the first embodiment. It is to be noted that also in the operation waveform of FIG. 7, as in FIG. 6, it is assumed that the setting of the control gain follows the lookup table 500 described with reference to FIG. 5, and the control gain change unit 113 operates so that the current control is set to the high gain only in the steady state in order to suppress the steadily occurring current pulsation. On the other hand, in the operation waveform of FIG. 7, unlike FIG. 6, it is assumed that the value of the q-axis current command $I_q*$ is constant, and the control gain change condition presented in FIG. 5 is always set to the condition A. That is, when the value of the q-axis current controlling judgement signal $S_{jq}$ represents a transient state, i.e., specifically, when $S_{jq}=S_{jq\_p}$ or $S_{jq}=S_{jq\_n}$ is true, the value of the q-axis current controlling gain $\omega_{cq}$ is assumed to be set to $\omega_{cq}=\omega_{cq\_pA}$ ($=\omega_{cq\_nA}$).

First, in the period of $0 \le t < t_4$, $\Delta I_{q\_n} \le \Delta I_q \le \Delta I_{q\_p}$ is true. Therefore, the control state judgement unit 112 judges that the control state of the power conversion circuit 103 is a steady state, and the value of the q-axis current controlling judgement signal $S_{jq}$ output from the control state judgement unit 112 becomes $S_{jq}=S_{jq\_pn}$, as presented in the lower part of FIG. 7. Accordingly, the value of the q-axis current controlling gain $\omega_{cq}$ at this time is maintained at $\omega_{cq\_pnA}$ (high-gain setting), as presented in the middle part of FIG. 7. This suppresses the steadily occurring current pulsation in the steady state.

When a disturbance occurs at $t=t_4$, although the value of the q-axis current command $I_q*$ is maintained at the predetermined command value $I_{qA}*$, the q-axis actual current $I_{qc}$ starts to largely fluctuate in response to the disturbance, as presented in the upper part of FIG. 7. As a result, in the period $t_4 < t < t_5$, the judgement result of the control state by the control state judgement unit 112 goes back and forth between the steady state and the transient state in accordance with the fluctuation of the q-axis actual current $I_{qc}$ caused by the disturbance, and the value of the q-axis current controlling judgement signal $S_{jq}$ output from the control state judgement unit 112 fluctuates in a short length of time. Specifically, as presented in the lower part of FIG. 7, the value of the q-axis current controlling judgement signal Sjq at the time of occurrence of disturbance changes sequentially as $S_{jq\_pn} \to S_{jq\_n} \to S_{jq\_pn} \to S_{jq\_p}$.

If the q-axis current controlling gain $\omega_{cq}$ is immediately changed in accordance with the change in the q-axis current controlling judgement signal $S_{jq}$ as described above, the normal setting ($\omega_{cq}=\omega_{cq\_pA}$) and the high-gain setting ($\omega_{cq}=\omega_{cq\_pnA}$) are switched in a short period of time.

As a result, the impact of the disturbance is promoted, and the operation may become unstable. However, the motor drive device 100 according to the present embodiment has the low-pass filters 403 and 405 with reset in which the control gain change unit 113 acts as a delay time element, and when switching from the normal setting to the high-gain setting, the d-axis current controlling gain $\omega_{cd}$ and the q-axis current controlling gain $\omega_{cq}$ are changed through these low-pass filters. Accordingly, as presented in the middle part of FIG. 7, in the period of $t_4 < t < t_5$ during occurrence of disturbance, the q-axis current controlling gain $\omega_{cq}$ is maintained approximately at the value ($\omega_{cq}=\omega_{cq\_pA}$) of the normal setting, and hence the stable operation can be realized.

Thereafter, in the period of $t_5 \le t$, $\Delta I_{q\_n} \le \Delta I_q \le \Delta I_{q\_p}$ is true again. Therefore, the control state judgement unit 112 judges that the control state of the power conversion circuit 103 is a steady state, and the value of the q-axis current controlling judgement signal $S_{jq}$ output from the control state judgement unit 112 becomes $S_{jq}=S_{jq\_pn}$, as presented in the lower part of FIG. 7. The value of the q-axis current controlling gain $\omega_{cq}$ output by the control gain change unit 113 at this time is changed from $\omega_{cq\_pA}$ to $\omega_{cq\_pnA}$ (high-gain setting) with a certain delay time, as presented in the middle part of FIG. 7. This suppresses the steadily occurring current pulsation, similarly to the period of $0 \le t < t_4$ described above.

It is to be noted that in the operation examples of FIGS. 6 and 7 described above, the value of the q-axis current controlling gain $\omega_{cq}$ is changed by changing the value of the q-axis current controlling judgement signal $S_{jq}$ on the basis of the difference $\Delta I_q$ between the q-axis current command $I_q^*$ and the q-axis actual current $I_{qc}$, but the value of the d-axis current controlling gain $\omega_{qc}$ can also be changed by the same method. That is, by changing the value of the d-axis current controlling judgement signal $S_{jd}$ on the basis of the difference $\Delta I_d$ between the d-axis current command $I_d^*$ and the d-axis actual current $I_{dc}$, it is possible to change the value of the d-axis current controlling gain $\omega_{cd}$ so that a stable operation is performed at the time of occurrence of disturbance while the steadily occurring current pulsation is suppressed.

According to the first embodiment of the present invention described above, the following operations and effects are achieved.

(1) The motor drive device 100 includes the power conversion circuit 103 that drives the alternating-current motor 101, and the controller 102 that controls the power conversion circuit 103.

The controller 102 has the voltage command calculation unit 108 that calculates the d-axis voltage command $V_d^*$ and the q-axis voltage command $V_q^*$ for operating the power conversion circuit 103 on the basis of the differences $\Delta I_d$ and $\Delta I_q$ between the d-axis current command $I_d^*$ and the q-axis current command $I_q^*$ and the d-axis actual current $I_{dc}$ and the q-axis actual current $I_{qc}$ that flow through in the alternating-current motor 101, the control state judgement unit 112 that outputs the d-axis current controlling judgement signal $S_{jd}$ and the q-axis current controlling judgement signal $S_{jq}$ corresponding the control state of the power conversion circuit 103 on the basis of the differences $\Delta I_d$ and $\Delta I_q$, and the control gain change unit 113 that changes the d-axis current controlling gain $\omega_{cd}$ and the q-axis current controlling gain $\omega_{cq}$ used for the voltage command calculation unit 108 to calculate the d-axis voltage command $V_d^*$ and the q-axis voltage command $V_q^*$, respectively on the basis of the d-axis current controlling judgement signal $S_{jd}$ and the q-axis current controlling judgement signal $S_{jq}$. The control state judgement unit 112 outputs $S_{jd}=S_{jd\_pn}$ and $S_{jq}=S_{jq\_pn}$ as judgement signals indicating a steady state when the differences $\Delta I_d$ and $\Delta I_q$ respectively satisfy predetermined range conditions, and outputs $S_{jd}=S_{jd\_p}$ (or $S_{jd}=S_{jd\_n}$) and $S_{jq}=S_{jq\_p}$ (or $S_{jq}=S_{jq\_n}$) as judgement signals indicating a transient state when the differences $\Delta I_d$ and $\Delta I_q$ respectively do not satisfy the range conditions. As shown in FIGS. 6 and 7, when the d-axis current controlling judgement signal $S_{jd}$ and the q-axis current controlling judgement signal $S_{jq}$ output from the control state judgement unit 112 are respectively switched from the judgement signal representing the steady state to the judgement signal representing the transient state, the control gain change unit 113 immediately changes the d-axis current controlling gain $\omega_{cd}$ and the q-axis current controlling gain $\omega_{cq}$ to the values of the normal setting corresponding to the judgement signal indicating the transient state. On the contrary, when the d-axis current controlling judgement signal $S_{jd}$ and the q-axis current controlling judgement signal $S_{jq}$ output from the control state judgement unit 112 are respectively switched from the judgement signal representing the transient state to the judgement signal representing the steady state, the control gain change unit 113 changes, with a predetermined delay time, the d-axis current controlling gain $\omega_{cd}$ and the q-axis current controlling gain $\omega_{cq}$ to the high-gain setting values corresponding to the judgement signal indicating the steady state. Thus, it is possible to perform stable current control even at the time of occurrence of disturbance while suppressing the steadily occurring current pulsation.

(2) The control gain change unit 113 has the low-pass filters 403 and 405 with reset and realizes a delay time by using the low-pass filters 403 and 405 with reset. Thus, it is possible to easily realize the delay time when the d-axis current controlling gain $\omega_{cd}$ and the q-axis current controlling gain $\omega_{cq}$ are changed from the values of the normal setting to the values of the high-gain setting.

(3) The control gain change unit 113 has the gain setting units 402 and 404 that hold the two-dimensional or higher-dimensional lookup table 500 and determine the values of the d-axis current controlling gain $\omega_{cd}$ and the q-axis current controlling gain $\omega_{cq}$ corresponding to the d-axis current controlling judgement signal $S_{jd}$ and the q-axis current controlling judgement signal $S_{jq}$ by using the lookup table 500. Thus, it is possible to easily determine the values of the d-axis current controlling gain $\omega_{cd}$ and the q-axis current controlling gain $\omega_{cq}$.

(4) The control gain change unit 113, as presented in FIG. 6, makes the value of the q-axis current controlling gain $\omega_{cq}$ corresponding to the judgement signal representing the transient state when the difference $\Delta I_q$ is a positive value, i.e., the setting value $\omega_{cq}=\omega_{cq\_pA}$ when $S_{jq}=S_{jq\_p}$, and the value of the q-axis current controlling gain $\omega_{cq}$ corresponding to the judgement signal representing the transient state when the difference $\Delta I_q$ is a negative value, i.e., the setting value $\omega_{cq}=\omega_{cq\_nB}$ when $S_{jq}=S_{jq\_n}$, different from each other. Thus, it is possible to set an appropriate control gain in each of the case where the current in the alternating-current motor 101 is increased and the case where the current in the alternating-current motor 101 is decreased.

Second Embodiment

In the first embodiment described above, the explanation has been made regarding the example in which, in the motor drive device according to the present invention, the delay time element at the time of control gain change is realized by the low-pass filter of the control gain change unit 113. On the other hand, as the second embodiment of the present invention, an explanation will be made regarding an example in which the delay time element at the time of control gain change is realized by an integrator.

Figure 8:
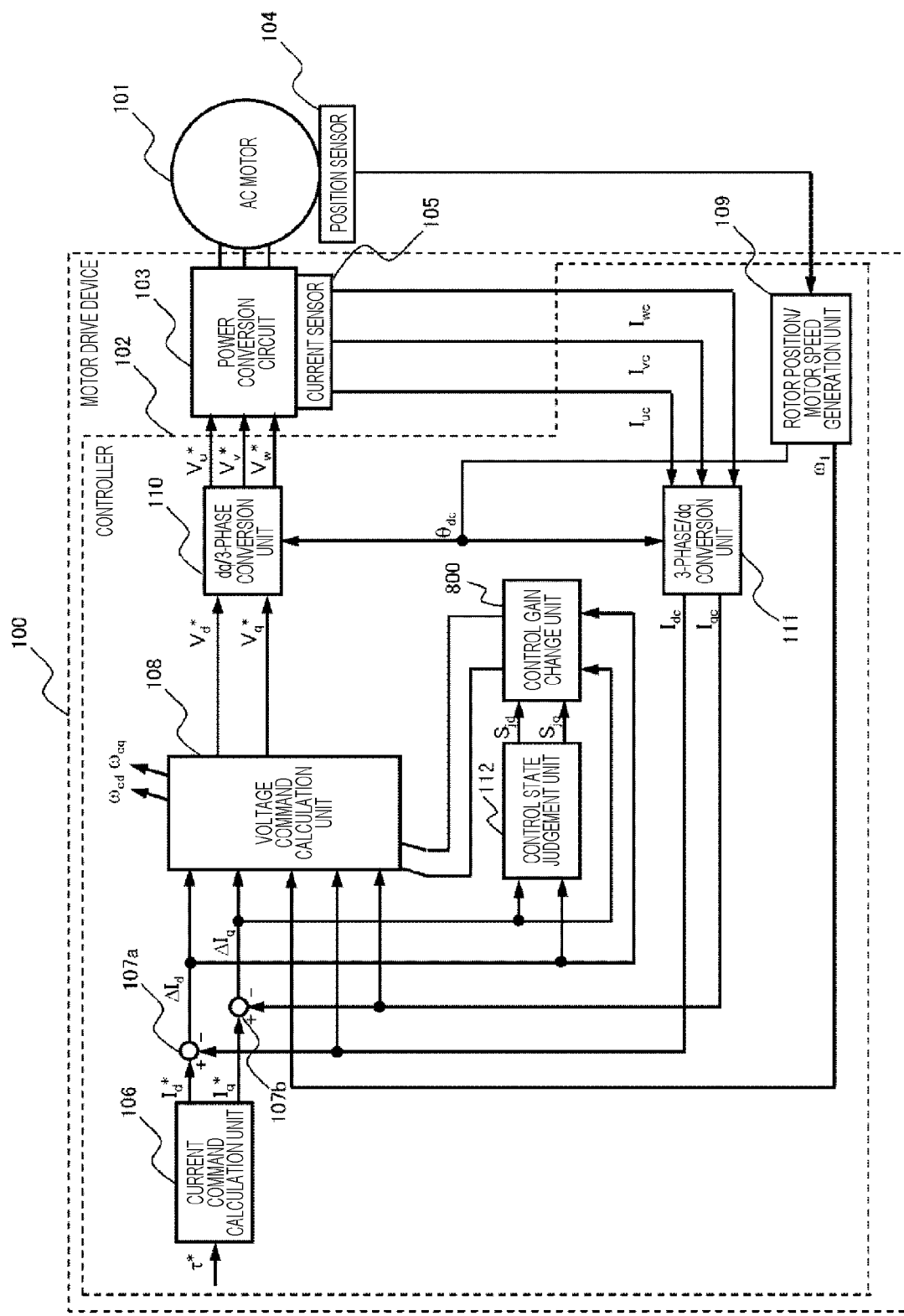
FIG. 8 is a view presenting a configuration of the motor drive device according to a second embodiment of the present invention.

FIG. 8 presents the configuration of the motor drive device according to the second embodiment of the present invention. As presented in FIG. 8, the motor drive device 100 according to the present embodiment is provided with a control gain change unit 800 in the controller 102, in place of the control gain change unit 113 of FIG. 1 described in the first embodiment. Other components are identical to those of the first embodiment.

Figure 9:
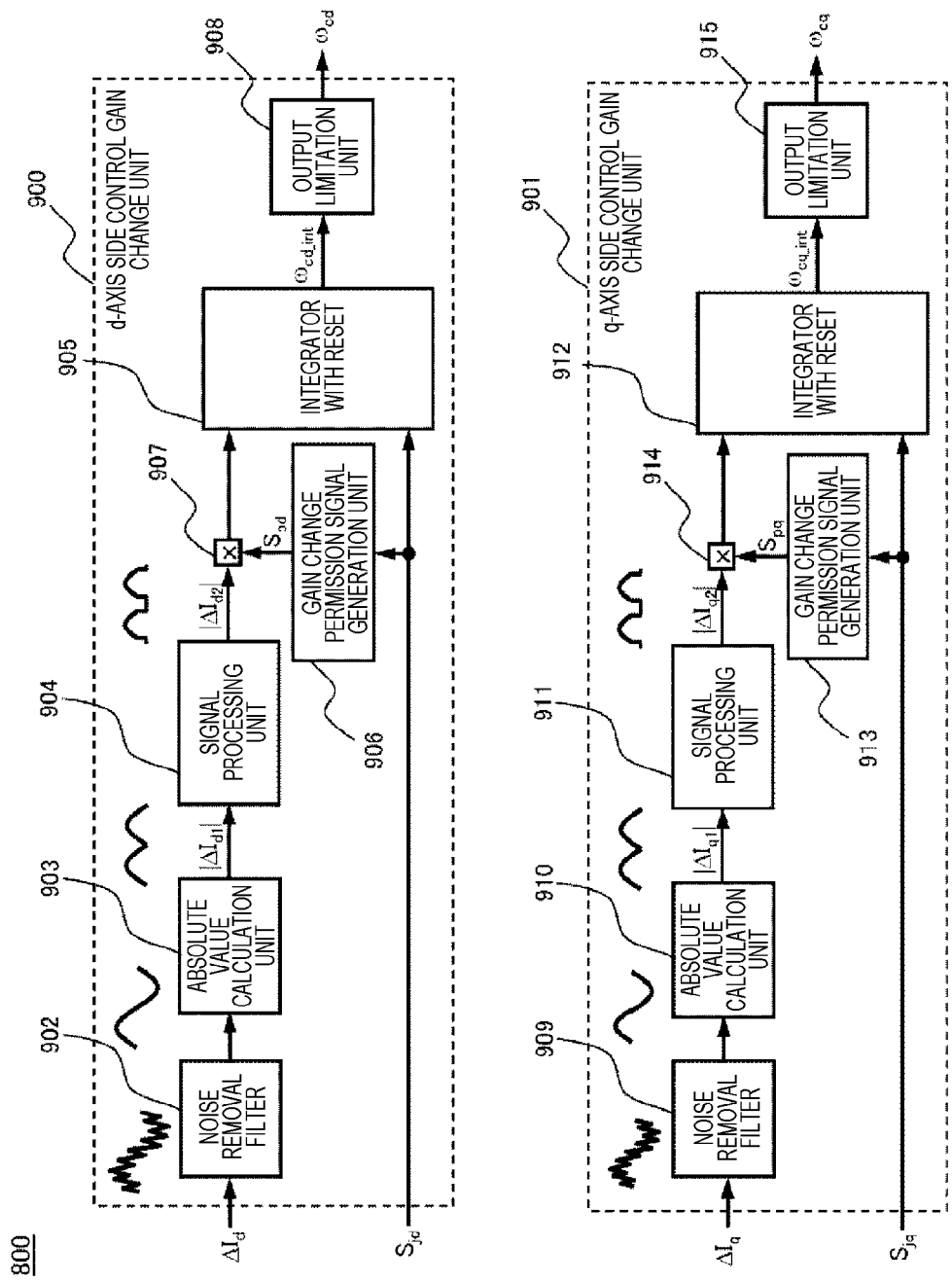
FIG. 9 is a view presenting an internal configuration of the control gain change unit in the second embodiment.

FIG. 9 illustrates the internal configuration of the control gain change unit 800, which is a feature of the present invention. As shown in FIG. 9, the control gain change unit 800 includes a d-axis side control gain change unit 900 used for calculation and change of the d-axis current controlling gain $\omega_{cd}$, and a q-axis side control gain change unit 901 used for calculation and change of the q-axis current controlling gain $\omega_{cq}$.

The d-axis side control gain change unit 900 includes a noise removal filter 902, an absolute value calculation unit 903, a signal processing unit 904, an integrator 905 with reset, a gain change permission signal generation unit 906, a multiplication unit 907, and an output limitation unit 908.

The noise removal filter 902 removes harmonic noise included in the difference $\Delta I_d$ representing the current deviation of the d-axis input to the control gain change unit 800, and outputs the noise-removed difference to the absolute value calculation unit 903. It is to be noted that the noise removal filter 902 is used just for removal of harmonic noise, and, unlike the low-pass filter 403 with reset and the low-pass filter 405 with reset in the first embodiment, it does not function as a delay time element of the control gain change unit 113.

The absolute value calculation unit 903 calculates an absolute value $|\Delta I_{d1}|$ of the difference $\Delta I_d$ after noise removal input from the noise removal filter 902.

The signal processing unit 904 performs signal processing of removing a component less than a predetermined threshold value from the absolute value $|\Delta I_{d1}|$ calculated by the absolute value calculation unit 903. Specifically, the signal processing unit 904 performs signal processing as described below, for example.

Figures 10, 11:
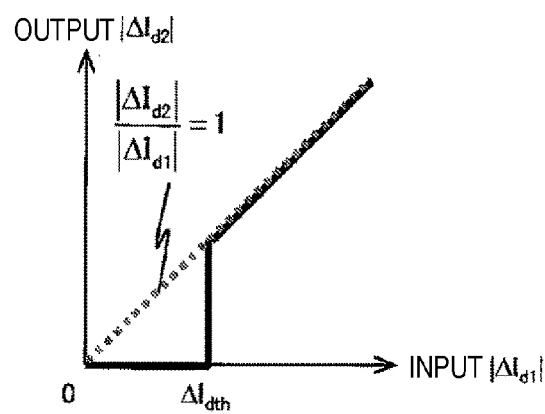
FIG. 10 is a view presenting input/output characteristics of a signal processing unit.
FIG. 11 is a view presenting permission signal—judgement signal characteristics in a gain change permission signal generation unit.

FIG. 10 presents input/output characteristics of the signal processing unit 904. When the absolute value $|\Delta I_{d1}|$ of the difference $\Delta I_d$ calculated by the absolute value calculation unit 903 is smaller than a predetermined threshold value, the signal processing unit 904 outputs zero as a signal processing result $|\Delta I_{d2}|$ for the absolute value $|\Delta I_{d1}|$. When the absolute value $|\Delta I_{d1}|$ of the difference $\Delta I_d$ calculated by the absolute value calculation unit 903 is equal to or greater than the threshold value, the signal processing unit 904 outputs the input absolute value $||\Delta I_{d1}|$ as it is as the signal processing result $|\Delta I_{d2}|$ for the absolute value $|\Delta I_{d1}|$. For example, as presented in FIG. 10, where the threshold value of the signal processing unit 904 is $\Delta I_{dth}$, the output $|\Delta I_{d2}|$ from the signal processing unit 904 becomes zero in the range of $0 \le |\Delta I_{d1}| < \Delta I_{dth}$. On the other hand, the processing in the range of $\Delta I_{dth} \le |\Delta I_{d1}|$ is that the input absolute value $|\Delta I_{d1}|$ is output as it is from the signal processing unit 904 as the output $|\Delta I_{d2}|$ of the signal processing unit 904. By executing such processing in the signal processing unit 904, the integrator 905 with reset executes arithmetic processing in which integration is not performed when the absolute value $|\Delta I_{d1}|$ of the difference $\Delta I_d$ is smaller than a predetermined value, and the absolute value $|\Delta I_{d1}|$ is integrated when the absolute value $|\Delta I_{d1}|$ of the difference $\Delta I_d$ is larger than the predetermined value. As a result, in the calculation of the d-axis current controlling gain $\omega_{cd}$ performed by the d-axis side control gain change unit 900, a minute current pulsation component arising from harmonic noise or the like can be ignored in calculation. Therefore, it is possible to avoid unnecessary integration calculation in the integrator 905 with reset.

The integrator 905 with reset integrates the output $|\Delta I_{d2}|$ of the signal processing unit 904, and outputs the integrated value resulting from the integration calculation as a d-axis side control gain $\omega_{cd\_int}$. The value of the d-axis side control gain $\omega_{cd\_int}$ obtained by the integration calculation of the integrator 905 with reset increases with a predetermined delay time due to the characteristic of the integration calculation.

Thus, when the control state of the power conversion circuit 103 is in the steady state, the d-axis side control gain $\omega_{cd\_int}$ is changed with a predetermined delay time from the value of normal setting to the value of high-gain setting that is relatively large.

An initial value $\omega_{cd\_ini}$ is set to the d-axis side control gain $\omega_{cd\_int}$ in the integrator 905 with reset, and resetting of the output is performed in accordance with the d-axis current controlling judgement signal $S_{jd}$. Specifically, similarly to the low-pass filter 403 with reset of FIG. 4 described in the first embodiment, when the d-axis current controlling judgement signal $S_{jd}$ changes from $S_{jd\_pn}$, which represents a steady state, to $S_{jd\_p}$, which represents a positive-side transient state, or changes from $S_{jd\_pn}$, which represents a steady state, to $S_{jd\_n}$, which represents a negative-side transient state, the result of the integration calculation obtained so far is reset so that the value of the d-axis side control gain $\omega_{cd\_int}$ is immediately returned to the initial value $\omega_{cd\_ini}$. It is to be noted that the initial value $\omega_{cd\_ini}$ is preferably set to the value of the control gain that comprehensively satisfies the control response performance such as an overshoot amount in a transient state, i.e., the value of the control gain corresponding to normal setting. Thus, similarly to the low-pass filter 403 with reset described in the first embodiment, when the control state of the power conversion circuit 103 shifts from the steady state to the transient state, the integrator 905 with reset can immediately return the value of the d-axis current controlling gain $\omega_{cd}$ based on the d-axis side control gain $\omega_{cd\_int}$ from the high-gain setting corresponding to the steady state to the normal setting corresponding to the transient state. By having set different initial values from each other between the positive-side transient state and the negative-side transient state, the control gain after reset may have different values in the case where the d-axis current controlling judgement signal $S_{jd}$ has changed from $S_{jd\_pn}$ to $S_{jd\_p}$ and in the case where the d-axis current controlling judgement signal $S_{jd}$ has changed from $S_{jd\_pn}$ to $S_{jd\_n}$, as in the first embodiment.

The gain change permission signal generation unit 906 generates a d-axis side gain change permission signal $S_{pd}$ for permitting or prohibiting integration calculation by the integrator 905 with reset, on the basis of the d-axis current controlling judgement signal $S_{jd}$. The gain change permission signal generation unit 906 generates the d-axis side gain change permission signal $S_{pd}$ that becomes 0 or 1 corresponding to the value of the d-axis current controlling judgement signal $S_{jd}$ in accordance with the permission signal —judgement signal characteristics presented in FIG. 11, for example.

FIG. 11 presents the permission signal—judgement signal characteristics of the gain change permission signal generation unit 906. As presented in FIG. 11, when the value of the d-axis current controlling judgement signal $S_{jd}$ represents a transient state, i.e., when $S_{jd}=S_{jd\_p}$ or $S_{jd}=S_{jd\_n}$, the value of the d-axis side gain change permission signal $S_{pd}$ is set to $S_{pd}=0$. On the other hand, when the value of the d-axis current controlling judgement signal $S_{jd}$ represents a steady state, i.e., when $S_{jd}=S_{jd\_pn}$, the value of the d-axis side gain change permission signal $S_{pd}$ is set to $S_{pd}=1$.

The multiplication unit 907 multiplies the output $|\Delta I_{d2}|$ of the signal processing unit 904 by the d-axis side gain change permission signal $S_{pd}$ output from the gain change permission signal generation unit 906, and outputs the multiplication result to the integrator 905 with reset. As described above, the value of the d-axis side gain change permission signal $S_{pd}$ is $S_{pd}=0$ in the case of the transient state, and $S_{pd}=1$ in the case of the steady state. Accordingly, in the case of the transient state, the input value from the multiplication unit 907 to the integrator 905 with reset becomes 0 regardless of the output $|\Delta I_{d2}|$ of the signal processing unit 904, and the integration calculation by the integrator 905 with reset is prohibited. On the other hand, in the case of the steady state, the output $|\Delta I_{d2}|$ of the signal processing unit 904 becomes the input value as it is from the multiplication unit 907 to the integrator 905 with reset, and the integration calculation by the integrator 905 with reset is permitted.

The output limitation unit 908 limits the value of the d-axis side control gain $\omega_{cd\_int}$ obtained by the integrator

905 with reset to between a predetermined minimum value $\omega_{cd\_min}$ to a predetermined maximum value $\omega_{cd\_max}$. Then, the value of the limited d-axis side control gain $\omega_{cd\_int}$ is output as the d-axis current controlling gain $\omega_{cd}$. The signal processing of the output limitation unit 908 can avoid the d-axis current controlling gain $\omega_{cd}$ from diverging in accordance with the integration result of the integrator 905 with reset.

The q-axis side control gain change unit 901 has the same configuration as the d-axis side control gain change unit 900 has. That is, the q-axis side control gain change unit 901 includes a noise removal filter 909, an absolute value calculation unit 910, a signal processing unit 911, an integrator 912 with reset, a gain change permission signal generation unit 913, a multiplication unit 914, and an output limitation unit 915. The noise removal filter 909 removes harmonic noise included in the difference $\Delta I_q$ input to the control gain change unit 800, and outputs the noise-removed difference to the absolute value calculation unit 910. The absolute value calculation unit 910 calculates an absolute value $|\Delta I_{q1}|$ of the difference $\Delta I_q$ after noise removal having been input. The signal processing unit 911 removes a component less than a predetermined threshold value from the absolute value $|\Delta I_{q1}|$ calculated by the absolute value calculation unit 910, and outputs a signal processing result $|\Delta I_{q2}|$ for the absolute value $|\Delta I_{q1}|$. The integrator 912 with reset integrates the signal processing result $|\Delta I_{q2}|$ by the signal processing unit 911 and outputs the integrated value by the integration calculation as a q-axis side control gain $\omega_{cq\_int}$. The gain change permission signal generation unit 913 generates a q-axis side gain change permission signal $S_{pq}$ that becomes 0 or 1 corresponding to the value of the q-axis current controlling judgement signal $S_{jq}$.

The multiplication unit 914 multiplies the output $|\Delta I_{q2}|$ of the signal processing unit 911 and the q-axis side gain change permission signal $S_{pq}$ output from the gain change permission signal generation unit 913, and outputs the multiplication result to the integrator 912 with reset, thereby permitting or prohibiting integration calculation by the integrator 912 with reset corresponding to the value of the q-axis side gain change permission signal $S_{pq}$. The output limitation unit 915 limits the value of the q-axis side control gain $\omega_{cq\_int}$ obtained by the integration calculation of the integrator 912 with reset within a predetermined range, and outputs the value of the q-axis side control gain $\omega_{cq\_int}$ as the q-axis current controlling gain $\omega_{cq}$.

Figure 12:
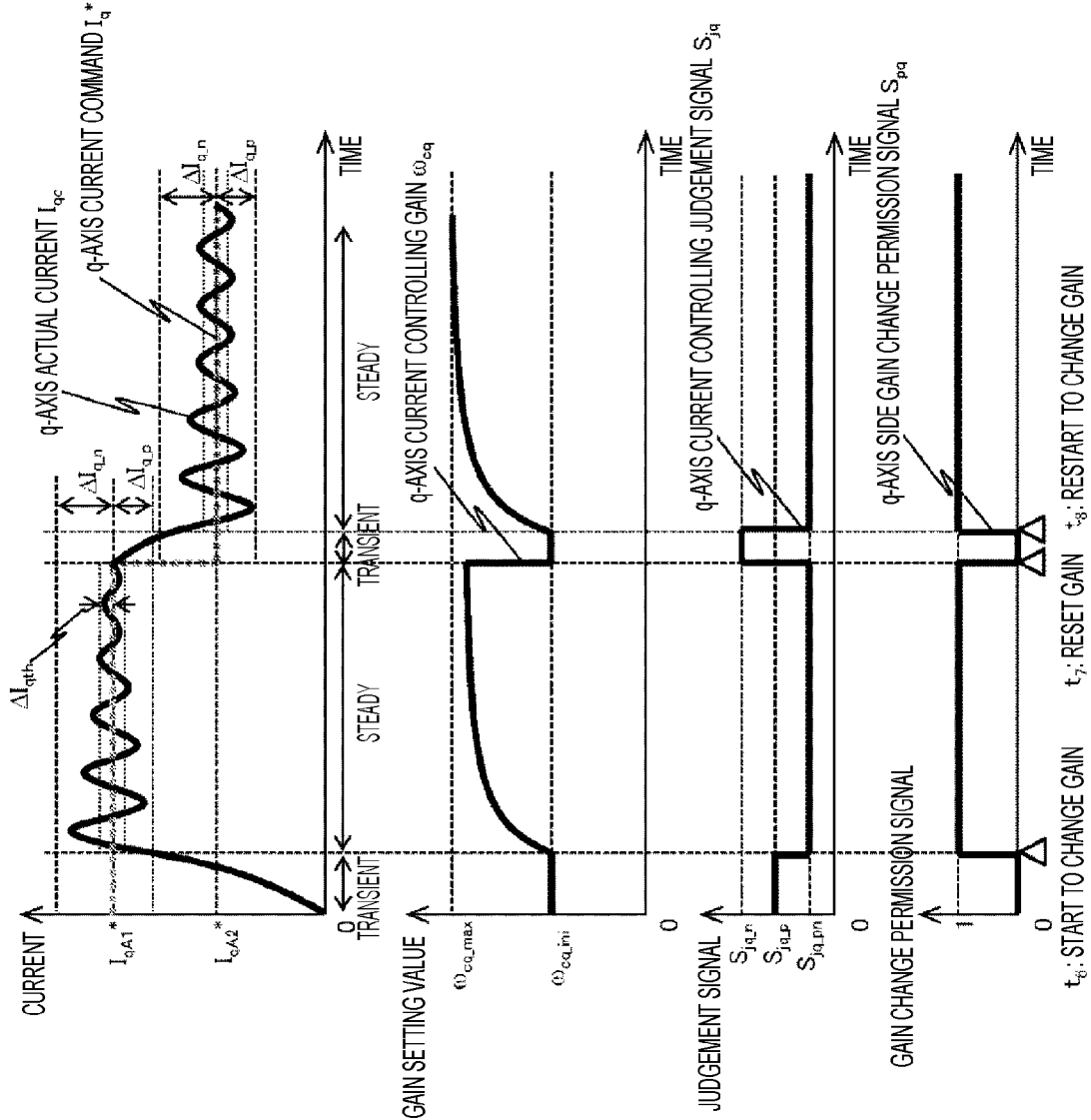
FIG. 12 is a view presenting an operation waveform example at a normal time of the motor drive device according to the second embodiment.

Next, a specific operation example of the motor drive device 100 according to the present embodiment will be described. First, an operation example at a normal time where a disturbance or the like does not occur will be described with reference to FIG. 12. FIG. 12 presents an operation waveform example at a normal time of the motor drive device 100 according to the second embodiment. It is to be noted that in the operation waveform of FIG. 12, it is assumed that the output limitation unit 915 limits the value of the q-axis side control gain $\omega_{cq\_int}$ obtained by the integration calculation of the integrator 912 with reset within the range of $0 \leq \omega_{cq\_int} \leq \omega_{cq\_max}$, and outputs the value of the q-axis side control gain $\omega_{cq\_int}$ as the q-axis current controlling gain $\omega_{cq}$.

First, at t=0, when the input of the torque command τ* to the controller 102 is started, the value of the q-axis current command $I_q^*$ changes stepwise from 0 to a predetermined command value $I_{qA1}^*$ corresponding to the torque command τ*. Then, as presented in the upper part of FIG. 12, the q-axis actual current $I_{qc}$ rapidly increases from 0 towards $I_{qA1}^*$, but in the period of $0 \leq t < t_6$, the value of the difference $\Delta I_q$ is large in the positive direction and $\Delta I_{q\_p} < \Delta I_q$. Therefore, similarly to the case of FIG. 6 described in the first embodiment, the control state judgement unit 112 judges that the control state of the power conversion circuit 103 is a transient state, and the value of the q-axis current controlling judgement signal $S_{jq}$ output from the control state judgement unit 112 becomes $S_{jq} = S_{jq\_p}$, as presented in the lower middle part of FIG. 12. Accordingly, the value of the q-axis side gain change permission signal $S_{pq}$ output from the gain change permission signal generation unit 913 becomes 0 as presented in the lower part of FIG. 12, and an input value ($|\Delta I_{q2}| \times S_{pq}$) to the integrator 912 with reset becomes 0, and hence the integration calculation by the integrator 912 with reset is prohibited. As a result, the value of the q-axis current controlling gain $\omega_{cq}$ output by the control gain change unit 800 is maintained at $\omega_{cq} = \omega_{cq\_ini}$, which is the initial value of the normal setting corresponding to the transient state, as presented in the upper middle part of FIG. 12.

Thereafter, where the time point at which the value of the difference $\Delta I_q$ coincides with the threshold value $\Delta I_{q\_p}$ is $t_6$, $\Delta I_{q\_n} \leq \Delta I_q \leq \Delta I_{q\_p}$ is true in the period of $t_6 \leq t < t_7$. Therefore, as in the case of FIG. 6 described in the first embodiment, the control state judgement unit 112 judges that the control state of the power conversion circuit 103 is a steady state, and the value of the q-axis current controlling judgement signal $S_{jq}$ output from the control state judgement unit 112 becomes $S_{jq} = S_{jq\_pn}$, as presented in the lower middle part of FIG. 12. That is, the value of the q-axis current controlling judgement signal $S_{jq}$ changes from $S_{jq\_p}$ to $S_{jq\_pn}$ at the time point $t_6$ and is maintained as it is until the time point $t_7$. At this time, the value of the q-axis side gain change permission signal $S_{pq}$ output from the gain change permission signal generation unit 913 becomes 1 as presented in the lower part of FIG. 12, and, in accordance therewith, $|\Delta I_{q2}|$ is input to the integrator 912 with reset, thereby permitting the integration calculation by the integrator 912 with reset. As a result, the value of the q-axis current controlling gain $\omega_{cq}$ output by the control gain change unit 800, as presented in the upper middle part of FIG. 12, increases by integrating $|\Delta_{q2}|$ and is changed from $\omega_{cq\_ini}$ to high-gain setting with a predetermined delay time. This suppresses the steadily occurring current pulsation in the steady state.

It is to be noted that when in the period of $t_6 \leq t < t_7$, the q-axis actual current $I_{qc}$ substantially coincides with the command value $I_{qA1}^*$ and the absolute value $|\Delta I_{d1}|$ of the difference $\Delta I_q$ becomes sufficiently small and becomes $|\Delta I_{d1}| < \Delta I_{qth}$ with respect to a threshold value $\Delta I_{qth}$ of the signal processing unit 911, the output $|\Delta I_{q2}|$ from the signal processing unit 911 becomes always zero, whereby the accumulation calculation by the integrator 912 with reset is stopped. As a result, in the subsequent period, the q-axis current controlling gain $\omega_{cq}$ is maintained at a constant value.

At $t = t_7$, the value of the q-axis current command $I_q^*$ changes stepwise from the previous command value $I_{qA1}^*$ to another command value $I_{qA2}^*$. Then, as presented in the upper part of FIG. 12, the q-axis actual current $I_{qc}$ maintained in the steady state decreases towards $I_{qA2}^*$, but in the period of $t_7 \leq t < t_8$, the value of the difference $\Delta I_q$ is large in the negative direction and $\Delta I_q < \Delta I_{q\_n}$. Therefore, similarly to the case of FIG. 6 described in the first embodiment, the control state judgement unit 112 judges that the control state of the power conversion circuit 103 is a transient state, and the value of the q-axis current controlling judgement signal $S_{jq}$ output from the control state judgement unit 112 becomes $S_{jq} = S_{jq\_n}$, as presented in the lower middle part of FIG. 12. That is, when the q-axis current controlling judgement signal $S_{jq}$ changes from $S_{jq\_pn}$, which represents a steady state, to $S_{jq\_n}$, which represents a negative-side transient state, a rising edge occurs in the q-axis current controlling judgement signal $S_{jq}$, as presented in the lower part of FIG. 12. When this rising edge is detected, the output of the integrator 912 with reset is reset as described above, and hence the value of the q-axis current controlling gain $\omega_{cq}$ output by the control gain change unit 800 is immediately changed from the high-gain setting to the initial value $\omega_{cq}=\omega_{cq\_ini}$ of normal setting corresponding to the transient state, as presented in the upper middle part of FIG. 12.

Thereafter, where the time point at which the value of the difference $\Delta I_q$ coincides with the threshold value $\Delta I_{q\_n}$ is $t_8$, $\Delta I_{q\_n} \leq \Delta I_q \leq \Delta I_{q\_p}$ is true again in the period of $t_8 \leq t$. Therefore, the control state judgement unit 112 judges that the control state of the power conversion circuit 103 is a steady state, and the value of the q-axis current controlling judgement signal $S_{jq}$ output from the control state judgement unit 112 becomes $S_{jq}=S_{jq\_pn}$, as presented in the lower middle part of FIG. 12. That is, the value of the q-axis current controlling judgement signal $S_{jq}$ changes from $S_{jq\_n}$ to $S_{jq\_pn}$ again at time point $t_8$ and is maintained also thereafter. At this time, the value of the q-axis side gain change permission signal $S_{pq}$ output from the gain change permission signal generation unit 913 becomes 1 as presented in the lower part of FIG. 12, and, in accordance therewith, $|\Delta_{q2}|$ is input to the integrator 912 with reset, thereby permitting the integration calculation by the integrator 912 with reset. As a result, similarly to the period of $t_6 \leq t < t_7$ described above, the value of the q-axis current controlling gain $\omega_{cq}$ output by the control gain change unit 800, as presented in the upper middle part of FIG. 12, increases as $|I_{q2}|$ is integrated, and is changed from $\omega_{cq\_ini}$ to high-gain setting with a predetermined delay time. This suppresses the steadily occurring current pulsation in the steady state.

It is to be noted that when in the period of $t_8 \leq t$, the value of the q-axis current controlling gain $\omega_{cq}$ reaches a predetermined maximum value $\omega_{cq\_max}$ in the output limitation unit 915, the increase of the q-axis current controlling gain $\omega_{cq}$ is limited by the output limitation unit 915 even if $\Delta I_{qth} < |\Delta I_{d1}|$, which is an execution condition of an integration calculation by the integrator 912 with reset, is satisfied. As a result, in the subsequent period, the q-axis current controlling gain $\omega_{cq}$ is maintained at maximum value $\omega_{cq\_max}$.

As described above, also in the second embodiment, similarly to the first embodiment, in the operation at a normal time where disturbance or the like does not occur, the current control can be set to the high gain only at the steady time by judging the control state of the power conversion circuit 103 from the value of the difference $\Delta I_q$. Therefore, it is possible to suppress the steadily occurring current pulsation without affecting the performance at the time of transient response.

Since the control gain change unit 800 in the second embodiment has the delay time element same as that of the control gain change unit 113 described in the first embodiment, the operation at the time of occurrence of disturbance is also the same. Accordingly, also in the second embodiment, as in the first embodiment, it is possible to realize a stable operation even at the time of occurrence of disturbance. It is to be noted that a description of a specific example of the operation at the time of occurrence of disturbance will be omitted.

In the first embodiment, the control gain determined offline is stored in a lookup table as presented in FIG. 5. On the other hand, the second embodiment is different from the first embodiment in that in the second embodiment, the control gain is automatically determined online as presented in FIG. 12.

According to the second embodiment of the present invention described above, in addition to the operations and effects same as (1) described in the first embodiment, the following operations and effects are achieved.

(5) The control gain change unit 800 has the integrators 905 and 912 with reset and realizes a delay time by using the integrators 905 and 912 with reset. Thus, as in the first embodiment, it is possible to easily realize the delay time when the d-axis current controlling gain $\omega_{cd}$ and the q-axis current controlling gain $\omega_{cq}$ are changed from the values of the normal setting to the values of the high-gain setting.

(6) The control gain change unit 800 determines the d-axis current controlling gain $\omega_{cd}$ and the q-axis current controlling gain $\omega_{cq}$ on the basis of the values obtained by integrating, using the integrators 905 and 912 with reset, respectively, the absolute values $|\Delta I_{d1}|$ and $|\Delta I_{q1}|$ of the differences $\Delta I_d$ and $\Delta I_q$ between the d-axis current command $I_d^*$ and the q-axis current command $I_q^*$ and the d-axis actual current $I_{dc}$ and the q-axis actual current $I_{qc}$ that flow through in the alternating-current motor 101. Thus, it is possible to automatically determine online the values of the d-axis current controlling gain $\omega_{cd}$ and the q-axis current controlling gain $\omega_{cq}$.

(7) By the operations of the signal processing units 904 and 911, the integrators 905 and 912 with reset integrate 0 when the absolute values $|\Delta I_{d1}|$ and $|\Delta I_{q1}|$ of the differences $\Delta I_d$ and $\Delta I_q$ are smaller than a predetermined value, and integrates the absolute values $|\Delta I_{d1}|$ and $|\Delta_{q1}|$, respectively when the absolute values $|\Delta I_{d1}|$ and $|\Delta I_{q1}|$ are larger than the predetermined value. Thus, a minute current pulsation component arising from harmonic noise or the like can be ignored in calculation, and unnecessary integration calculation can be avoided.

(8) By the operations of the gain change permission signal generation units 906 and 913 and the multiplication units 907 and 914, the control gain change unit 800 permits integration calculation by the integrators 905 and 912 with reset when the d-axis current controlling judgement signal $S_{jd}$ and the q-axis current controlling judgement signal $S_{jq}$ output from the control state judgement unit 112 respectively represent a steady state, i.e., when $S_{jd}=S_{jd\_pn}$ and $S_{jq}=S_{jq\_pn}$ are true. On the other hand, the control gain change unit 800 prohibits integration calculation by the integrators 905 and 912 with reset when the d-axis current controlling judgement signal $S_{jd}$ and the q-axis current controlling judgement signal $S_{jq}$ output from the control state judgement unit 112 respectively represent a transient state, i.e., when $S_{jd}=S_{jd\_p}$ (or $S_{jd}=S_{jd\_n}$) and $S_{jq}=S_{jq\_p}$ (or $S_{jq}=S_{jd\_n}$). Thus, it is possible to easily determine the value of the normal setting and the value of the high-gain setting in the d-axis current controlling gain $\omega_{cd}$ and the q-axis current controlling gain $\omega_{cq}$, respectively, by using the integrators 905 and 912 with reset.

(9) The control gain change unit 800 resets the results of accumulation calculations by the integrators 905 and 912 with reset to return the values of control gain to predetermined initial values $\omega_{cd\_ini}$ and $\omega_{cq\_ini}$ when the d-axis current controlling judgement signal $S_{jd}$ and the q-axis current controlling judgement signal $S_{jq}$ output from the control state judgement unit 112 respectively are switched from the values ($S_{jd}=S_{jd\_pn}$ and $S_{jq}=S_{jq\_pn}$) indicating the steady state to the values ($S_{jd}=S_{jd\_p}$ or $S_{jd\_n}$ and $S_{jq}=S_{jq\_p}$ or $S_{jq\_n}$) indicating the transient state. Thus, when the control state of the power conversion circuit 103 shifts from the steady state to the transient state, it is possible to immediately return the setting of the d-axis current controlling gain $\omega_{cd}$ and the q-axis current controlling gain $\omega_{cq}$ from the high-gain setting corresponding to the steady state to the normal setting corresponding to the transient state.

Third Embodiment

In the first and second embodiments described above, the motor drive device 100 according to the present invention has been described. On the other hand, as the third embodiment of the present invention, an example in which the motor drive device 100 is equipped in an electric vehicle system will be described below.

Figure 13:
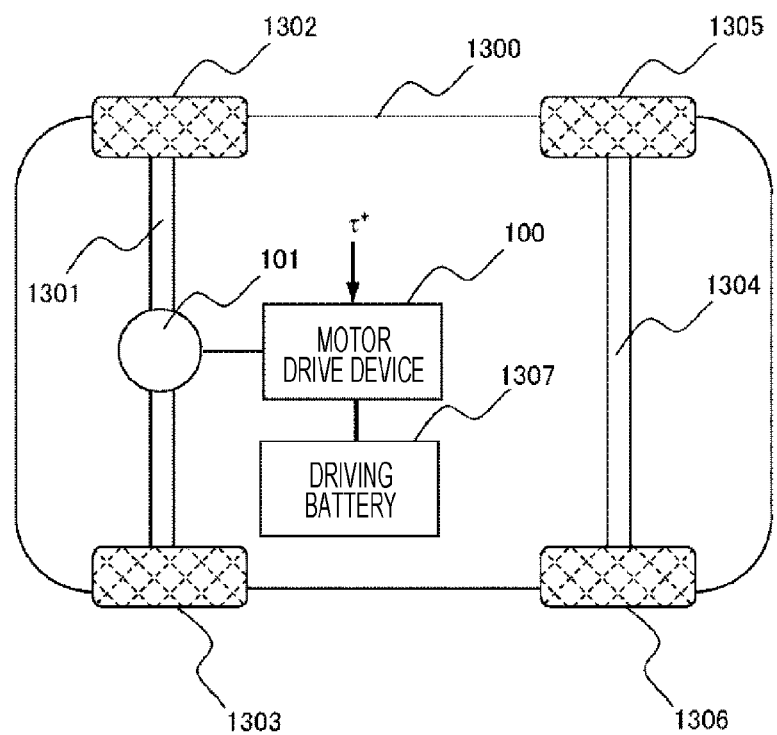
FIG. 13 is a view presenting a configuration of an electric vehicle system equipped with the motor drive device according to a third embodiment of the present invention.

FIG. 13 presents the configuration of an electric vehicle system equipped with the motor drive device according to the third embodiment of the present invention. As presented in FIG. 13, an electric vehicle system 1300 according to the present embodiment includes the motor drive device 100, the alternating-current motor 101, an axle 1301, a wheel 1302, a wheel 1303, an axle 1304, a wheel 1305, a wheel 1306, and a driving battery 1307. It is to be noted that the motor drive device 100 and the alternating-current motor 101 are the same as those described in the first and second embodiments, respectively.

In the electric vehicle system 1300, the axle 1301 is pivotally supported on one side of the front or rear of the vehicle, and the wheel 1302 and the wheel 1303 are arranged at both ends of the axle. Also on the other side, the axle 1304 is pivotally supported, and the wheel 1305 and the wheel 1306 are arranged at both ends of the axle. The axle 1301 serving as a drive shaft is mechanically connected with the alternating-current motor 101. Rotation power of the alternating-current motor 101 driven by the motor drive device 100 is transmitted via the axle 1301 to the wheel 1302 and the wheel 1303 serving as driving wheels. Using power supplied from the driving battery 1307, the motor drive device 100 drives the alternating-current motor 101 by receiving the torque command $\tau^*$ generated by a higher-order system (not illustrated).

In the present embodiment, the controller 102 included in the motor drive device 100 performs the current control calculation as described in the first and second embodiments. As a result, the steadily occurring current pulsation is suppressed, and hence vibration and noise in the alternating-current motor 101 are reduced. Accordingly, a high ride quality can be realized in the electric vehicle system 1300. In the electric vehicle system 1300, a disturbance in which the wheels are accidentally brought into a slip state or a lock state sometimes occurs. However, in the present embodiment, the processing of the controller 102 of the motor drive device 100 can realize a stable operation even in a state where such disturbance occurs.

It is to be noted that in the third embodiment of the present invention described above, the case where the motor drive device 100 is applied to the electric vehicle system 1300 has been described. However, the same effects can be obtained by applying the motor drive device 100 to other systems such as home appliances and railways. In summary, the present invention can be applied to any motor drive device including a feedback type current control.

The embodiments and various modifications described above are merely examples, and the present invention is not limited to these contents as long as the features of the invention are not impaired. Although various embodiments and modifications have been described above, the present invention is not limited to these contents. Other aspects conceivable within the scope of the technical idea of the present invention are also included within the scope of the present invention.

REFERENCE SIGNS LIST 100 motor drive device
101 alternating-current motor
102 controller
103 power conversion circuit
104 position sensor
105 current sensor
106 current command calculation unit
107a subtraction unit
107b subtraction unit
108 voltage command calculation unit
109 rotor position/motor speed generation unit
110 dq/3-phase conversion unit
111 3-phase/dq conversion unit
200 d-axis current controlling PI controller
201 addition unit
202 q-axis current controlling PI controller
203 addition unit
204 P control unit
205 I control unit
206 addition unit
207 P control unit
208 I control unit
209 addition unit
400 d-axis side control gain change unit
401 q-axis side control gain change unit
402 gain setting unit
403 low-pass filter with reset
404 gain setting unit
405 low-pass filter with reset
800 control gain change unit
900 d-axis side control gain change unit
901 q-axis side control gain change unit
902 noise removal filter
903 absolute value calculation unit
904 signal processing unit
905 integrator with reset
906 gain change permission signal generation unit
907 multiplication unit
908 output limitation unit
909 noise removal filter
910 absolute value calculation unit
911 signal processing unit
912 integrator with reset
913 gain change permission signal generation unit
914 multiplication unit
915 output limitation unit
1300 electric vehicle system
1301 axle
1302 wheel
1303 wheel
1304 axle
1305 wheel
1306 wheel
1307 driving battery

The invention claimed is:

1. A motor drive device, comprising:
a power conversion circuit that drives an alternating-current motor; and
a controller that controls the power conversion circuit, wherein
the controller has a voltage command calculation unit that calculates a voltage command for operating the power conversion circuit on a basis of a current deviation, which is a difference between a current command and an actual current flowing through the alternating-current motor, a control state judgement unit that outputs a judgement signal corresponding to a control state of the power conversion circuit on a basis of the current deviation, and a control gain change unit that changes a control gain used for the voltage command calculation unit to calculate the voltage command on a basis of the judgement signal, the control state judgement unit outputs a first judgement signal when the current deviation satisfies a predetermined range condition and outputs a second judgement signal when the current deviation does not satisfy the range condition, and the control gain change unit
immediately changes the control gain to a value corresponding to the second judgement signal when a judgement signal output from the control state judgement unit is switched from the first judgement signal to the second judgement signal, and changes, with a predetermined delay time, the control gain to a value corresponding to the first judgement signal when a judgement signal output from the control state judgement unit is switched from the second judgement signal to the first judgement signal.

2. The motor drive device according to claim 1, wherein the control gain change unit has a low-pass filter and realizes the delay time by using the low-pass filter.

3. The motor drive device according to claim 2, wherein the control gain change unit has a gain setting unit that holds a two-dimensional or higher-dimensional lookup table and determines a value of the control gain corresponding to the judgement signal by using the lookup table.

4. The motor drive device according to claim 1, wherein the control gain change unit has an integrator and realizes the delay time by using the integrator.

5. The motor drive device according to claim 4, wherein the control gain change unit determines a value of the control gain on a basis of a value obtained by integrating, using the integrator, an absolute value of the current deviation.

6. The motor drive device according to claim 4, wherein the integrator integrates 0 when an absolute value of the current deviation is smaller than a predetermined value, and integrates the absolute value of the current deviation when the absolute value of the current deviation is larger than the predetermined value.

7. The motor drive device according to claim 4, wherein the control gain change unit
permits an integration calculation by the integrator when a judgement signal output from the control state judgement unit is the first judgement signal, and prohibits an integration calculation by the integrator when a judgement signal output from the control state judgement unit is the second judgement signal.

8. The motor drive device according to claim 4, wherein the control gain change unit resets a result of an accumulation calculation by the integrator to return a value of the control gain to a predetermined initial value when a judgement signal output from the control state judgement unit is switched from the first judgement signal to the second judgement signal.

9. The motor drive device according to claim 1, wherein the control gain change unit makes a value of the control gain corresponding to the second judgement signal when the current deviation is a positive value and a value of the control gain corresponding to the second judgement signal when the current deviation is a negative value different from each other.

10. A controller that controls a power conversion circuit that drives an alternating-current motor, the controller, comprising:

a voltage command calculation unit that calculates a voltage command for operating the power conversion circuit on a basis of a current deviation corresponding to a difference between a current command and an actual current flowing through the alternating-current motor;

a control state judgement unit that outputs a judgement signal corresponding to a control state of the power conversion circuit on a basis of the current deviation; and a control gain change unit that changes a control gain used for the voltage command calculation unit to calculate the voltage command on a basis of the judgement signal, wherein the control state judgement unit outputs a first judgement signal when the current deviation satisfies a predetermined range condition and outputs a second judgement signal when the current deviation does not satisfy the range condition, and the control gain change unit
immediately changes the control gain to a value corresponding to the second judgement signal when a judgement signal output from the control state judgement unit is switched from the first judgement signal to the second judgement signal, and changes, with a predetermined delay time, the control gain to a value corresponding to the first judgement signal when a judgement signal output from the control state judgement unit is switched from the second judgement signal to the first judgement signal.

11. An electric vehicle system, comprising:
the motor drive device according to claim 1;
the alternating-current motor;
a pivotally supported axle mechanically connected with the alternating-current motor;
a wheel fixed to the axle; and
a driving battery that supplies power to the motor drive device.

* * * * *